(12) United States Patent
Hildreth

(10) Patent No.: US 7,542,921 B1
(45) Date of Patent: Jun. 2, 2009

(54) NETWORK-BASED FINANCIAL PLANNING SYSTEM AND METHOD

(75) Inventor: Diana G. Hildreth, Bethel, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 452 days.

(21) Appl. No.: 09/677,581

(22) Filed: Sep. 29, 2000

Related U.S. Application Data

(60) Provisional application No. 60/157,142, filed on Sep. 30, 1999.

(51) Int. Cl.
*G06Q 40/00* (2006.01)
(52) U.S. Cl. .......................... 705/26; 705/36
(58) Field of Classification Search .............. 705/10–44
See application file for complete search history.

(56) References Cited

U.S. PATENT DOCUMENTS

| | | | |
|---|---|---|---|
| 3,634,669 A | 1/1972 | Soumas et al. |
| 4,254,474 A | 3/1981 | Cooper et al. |
| 4,346,442 A | 8/1982 | Musmanno |
| 4,355,372 A | 10/1982 | Goldberg |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,042 A | 6/1987 | Hernandez et al. |
| 4,674,044 A | 6/1987 | Kalmus et al. |
| 4,736,294 A | 4/1988 | Le Grand |
| 4,739,478 A | 4/1988 | Roberts et al. |
| 4,760,604 A | 7/1988 | Cooper |
| 4,774,663 A | 9/1988 | Musmanno et al. |
| 4,831,526 A | 5/1989 | Luchs |
| 4,859,187 A | 8/1989 | Peterson |
| 4,866,634 A | 9/1989 | Reboh |
| 4,897,811 A | 1/1990 | Scofield |
| 4,972,504 A | 11/1990 | Daniel, Jr. |
| 5,041,972 A | 8/1991 | Frost |
| 5,093,907 A | 3/1992 | Hwong et al. |
| 5,220,500 A | 6/1993 | Baird |

(Continued)

FOREIGN PATENT DOCUMENTS

EP 0597316 5/1994

(Continued)

OTHER PUBLICATIONS

LA Times, Mortgage Math Made Easy OnLine, ISBN: 04583035, Los Angeles, California, Jun. 17, 1999.*

(Continued)

*Primary Examiner*—Frantzy Poinvil
(74) *Attorney, Agent, or Firm*—Hunton & Williams LLP

(57) ABSTRACT

A method and information processor are provided which allow a user of a user terminal to receive a list of credit financing opportunities based on the user's financing objectives in which credit data is received from the user terminal. The credit data includes the user's objective and a credit profile. Credit financing opportunities are determined based on the credit data and one or more predetermined decision rules. An output is generated and provided to the user terminal which includes a comparison of at least part of the credit profile with the determined credit financing opportunities.

69 Claims, 27 Drawing Sheets

U.S. PATENT DOCUMENTS

| | | | |
|---|---|---|---|
| 5,220,501 A | 6/1993 | Lawlor | |
| 5,227,874 A | 7/1993 | Von Kohorn | |
| 5,231,571 A | 7/1993 | D'Agostino | |
| 5,245,535 A | 9/1993 | Weiss et al. | |
| 5,278,751 A | 1/1994 | Adiano | |
| 5,297,032 A | 3/1994 | Trojan et al. | |
| 5,321,933 A | 6/1994 | Seifert et al. | |
| 5,381,470 A | 1/1995 | Cambray et al. | |
| 5,396,621 A | 3/1995 | MacGregor et al. | |
| 5,444,844 A | 8/1995 | Inoue | |
| 5,481,647 A | 1/1996 | Brody | |
| 5,490,060 A | 2/1996 | Malec | |
| 5,502,805 A | 3/1996 | Anderson et al. | |
| 5,523,942 A | 6/1996 | Tyler | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Agrawal et al. | |
| 5,623,591 A | 4/1997 | Cseri | |
| 5,644,727 A * | 7/1997 | Atkins | 705/40 |
| 5,649,116 A | 7/1997 | McCoy | |
| 5,655,085 A | 8/1997 | Ryan | |
| 5,657,437 A | 8/1997 | Bishop et al. | |
| 5,657,460 A | 8/1997 | Egan et al. | |
| 5,664,127 A | 9/1997 | Anderson et al. | |
| 5,671,363 A | 9/1997 | Cristofich et al. | |
| 5,675,746 A | 10/1997 | Marshall | |
| 5,689,650 A | 11/1997 | McClelland et al. | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A | 6/1998 | Andersen et al. | |
| 5,799,286 A | 8/1998 | Morgan et al. | |
| 5,802,502 A | 9/1998 | Gell | |
| 5,819,237 A | 10/1998 | Garman | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | DeFrancesco et al. | |
| 5,913,202 A | 6/1999 | Motoyama | |
| 5,918,217 A | 6/1999 | Maggioncalda | |
| 5,920,848 A | 7/1999 | Schutzer et al. | |
| 5,930,775 A | 7/1999 | McCauley | |
| 5,940,811 A | 8/1999 | Norris | |
| 5,940,812 A | 8/1999 | Tengel et al. | |
| 5,950,175 A | 9/1999 | Austin | |
| 5,963,953 A | 10/1999 | Cram et al. | |
| 5,970,467 A | 10/1999 | Alavi | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,741 A | 11/1999 | Speakman et al. | |
| 5,995,942 A | 11/1999 | Smith et al. | |
| 5,999,907 A | 12/1999 | Donner | |
| 6,008,817 A | 12/1999 | Gilmore, Jr. | |
| 6,009,415 A | 12/1999 | Shurling et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,029,195 A | 2/2000 | Herz | |
| 6,032,125 A | 2/2000 | Ando | |
| 6,044,371 A | 3/2000 | Person et al. | |
| 6,055,510 A | 4/2000 | Henrick | |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A | 7/2000 | Walker et al. | |
| 6,092,050 A | 7/2000 | Lungren et al. | |
| 6,097,391 A | 8/2000 | Wilcox | |
| 6,105,007 A * | 8/2000 | Norris | 705/38 |
| 6,108,641 A | 8/2000 | Kenna et al. | |
| 6,122,623 A | 9/2000 | Garman | |
| 6,154,731 A | 11/2000 | Monks et al. | |
| 6,173,270 B1 | 1/2001 | Cristofich et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,195,092 B1 | 2/2001 | Dhond et al. | |
| 6,199,077 B1 | 3/2001 | Inala et al. | |
| 6,202,053 B1 | 3/2001 | Christiansen et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,236,978 B1 | 5/2001 | Tuzhilin | |
| 6,243,093 B1 | 6/2001 | Czerwinski et al. | |
| 6,249,775 B1 | 6/2001 | Freeman et al. | |
| 6,256,649 B1 | 7/2001 | Mackinlay et al. | |
| 6,263,320 B1 | 7/2001 | Danilunas et al. | |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,282,551 B1 | 8/2001 | Anderson et al. | |
| 6,311,144 B1 | 10/2001 | Abu El Ata | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,330,551 B1 | 12/2001 | Burchetta et al. | |
| 6,349,290 B1 | 2/2002 | Horowitz et al. | |
| 6,349,291 B1 | 2/2002 | Varma | |
| 6,360,188 B1 | 3/2002 | Freidman et al. | |
| 6,363,393 B1 | 3/2002 | Ribitzky | |
| 6,405,204 B1 | 6/2002 | Baker et al. | |
| 6,452,613 B1 | 9/2002 | Lefebvre et al. | |
| 6,490,569 B1 | 12/2002 | Grune et al. | |
| 6,496,832 B2 | 12/2002 | Chi et al. | |
| 6,502,080 B1 | 12/2002 | Eichorst et al. | |
| 6,513,018 B1 | 1/2003 | Culhane | |
| 6,597,379 B1 | 7/2003 | Morris et al. | |
| 6,601,044 B1 | 7/2003 | Wallman | |
| 6,725,257 B1 | 4/2004 | Cansler et al. | |
| 6,741,975 B1 | 5/2004 | Nakisa et al. | |
| 6,850,923 B1 | 2/2005 | Nakisa et al. | |
| 6,985,880 B1 | 1/2006 | Hodgdon et al. | |
| 2001/0011243 A1 | 8/2001 | Dembo et al. | |
| 2001/0056398 A1 | 12/2001 | Scheirer | |
| 2002/0007330 A1 | 1/2002 | Kumar et al. | |
| 2002/0019791 A1 | 2/2002 | Goss et al. | |
| 2002/0019803 A1 | 2/2002 | Muller | |
| 2002/0059139 A1 | 5/2002 | Evans | |
| 2002/0067373 A1 | 6/2002 | Roe et al. | |
| 2002/0073005 A1 | 6/2002 | Welnicki et al. | |
| 2002/0078086 A1 | 6/2002 | Alden et al. | |
| 2002/0111850 A1 | 8/2002 | Smrckas et al. | |

| | | | |
|---|---|---|---|
| 2002/0111890 | A1 | 8/2002 | Sloan et al. |
| 2002/0133383 | A1 | 9/2002 | Chao et al. |
| 2002/0147668 | A1 | 10/2002 | Smith et al. |
| 2002/0198797 | A1 | 12/2002 | Cooper et al. |
| 2003/0018492 | A1 | 1/2003 | Carlson |
| 2003/0028466 | A1 | 2/2003 | Jenson et al. |
| 2003/0061132 | A1 | 3/2003 | Yu, Sr. et al. |
| 2003/0061137 | A1 | 3/2003 | Leung et al. |
| 2003/0093351 | A1 | 5/2003 | Sarabanchong |
| 2003/0212628 | A1 | 11/2003 | Kuttan et al. |
| 2003/0216965 | A1 | 11/2003 | Libman |
| 2003/0229582 | A1 | 12/2003 | Sherman et al. |
| 2004/0030626 | A1 | 2/2004 | Libman |
| 2004/0039588 | A1 | 2/2004 | Libman |
| 2004/0054610 | A1 | 3/2004 | Amstutz et al. |
| 2004/0236641 | A1 | 11/2004 | Abbott et al. |
| 2004/0267651 | A1 | 12/2004 | Jenson et al. |
| 2005/0004855 | A1 | 1/2005 | Jenson et al. |
| 2005/0004856 | A1 | 1/2005 | Brose et al. |
| 2005/0010510 | A1 | 1/2005 | Brose et al. |
| 2005/0027632 | A1 | 2/2005 | Zeitoun et al. |
| 2005/0060252 | A1 | 3/2005 | Doddington |
| 2005/0144108 | A1 | 6/2005 | Loeper |

FOREIGN PATENT DOCUMENTS

| | | |
|---|---|---|
| JP | 2002-163589 | 6/2002 |
| WO | WO 99/27479 | 6/1999 |
| WO | WO 00/02256 | 1/2000 |
| WO | WO 0026831 | 5/2000 |
| WO | WO 0026832 | 5/2000 |
| WO | WO 0026833 | 5/2000 |
| WO | WO 02/069212 | 9/2002 |

OTHER PUBLICATIONS

Philip, Storms, "Using mortgage credit to achieve client objectives", Journal of Financial Planning, Denver; Oct. 1997, vol. 9, Iss. 5; p. 77, 9pgs, ISSN/ISBN 10403981.*
LendingTree Mortgage, LendingTree.com, Applying Online in Minutes, Feb. 1, 1999.*
Hinds, "Making the most of Fast-Falling Mortgage Rates", NY Times, Late City Final Edition ED, Col. 2, p. 1, Jun. 30, 1985, Dialog file 471, Accession. No. 01055037.*
Roger et al., A Credit Scoring Model to Evaluate the Credit Worthiness of Credit Card Applicants, Developments in Marketing Science, vol. 5, 1982.
Pourmokhtar, A Hedge Fund Primer Version 0.1, www.emf.net/?farzin/hedgefund.html, printed Jul. 24, 2002, 5 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.
Taylor et al., Card Issuers Turn to Scoring as They Face Increasing Risk, Financial Services Report, vol. 8, No. 15, Jul. 24, 1991, p. 1.
Quinn, Credit Card Issuers Keeping a Closer Watch on How You Pay Bills, Washington Post, Staying Ahead, Business Section P6, Apr. 25, 1988, 1 page.
Friedland, Credit Scoring Digs Deeper into Data, Credit World, vol. 84, No. 5, May 1996, pp. 19-23.
Credit Scoring New Markets, Bank Technology News, vol. 9, No. 7, Jul. 1996, p. 1.
Derivatives Primer, CEIBA, Association for Financial Professionals, Committee on Investment of Employee Benefit Assets, Dec. 2001.
Cumby et al., Evaluating the Performance of International Mutual Funds, The Journal of Finance, vol. 45, No. 2, Jun. 1990, pp. 497-521.
Jameson, Expanding Risk Management Strategies: Key to Future Survival, Credit World, vol. 84, No. 5, May 1996, pp. 16-18.
FreeMarkets, printed on Apr. 26, 1999.
Armstrong, Fund of Funds: Perfect Solution or Dangerous Shortcut?, Investor Solutions, Inc., www.investorsolutions.com, printed Jul. 24, 2002.
GS-Calc 6.0.1.1; JPS Development; http://download.com, printed Sep. 3, 2003.
Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.
Hedge Fund Primer—The Basics, KSP Capital Management LLC, information@kspcapital.com, printed Jul. 24, 2002, 18 pages.
Hedge Fund Primer About Fund of Funds, Links Securities LLC, www.hedgefund.net/prime_fof.php3, 2002, 2 pages.
Kneis, Hedge Fund Strategies: A Primer, Canadianhedgewatch, p. 3.
Buchner et al., HotDoc: a flexible framework for spatial composition, Visual Languages, 1997, Proceedings, 1997 IEEE Symposium, Abstract, Sep. 23-26, 1997, pp. 92-99.
ASCH, How the RMA/Fair Isaac credit-scoring model was built, Journal of Commercial Lending, vol. 77, No. 10, Jun. 1995, pp. 10-16.
Huddling With William Bernstein: Small Town Doctor, Investing Pro.
Snyder et al., Identifying design requirements using analysis structures, Aerospace and Electronics Conference, 1991, NAECON, 1991, vol. 2, Abstract, May 20-24, 1991, pp. 786-792.
Meredith, Internet bank moves closer to virtual reality, USA Today, May 5, 1995.
Internet, Lending Tree, Mortgage Apply Online in Minutes, www.lendingtree.com, 7 pages, printed Feb. 1, 1999.
Makuch, Managing Consumer Credit Delinquency in the US Economy: A Multi-Billion Dollar Management Science Application, Interfaces, Feb. 1992, pp. 90-109.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Davenport et al., Numbers-a medium that counts [spreadsheet software]; Computer Graphics and Applications; IEEE; vol. 11; Issue 4; Abstract, Jul. 1991, pp. 39-44.
Opportunity Knocks at Scoring's Door, Collection and Credit Risk, vol. 2, No. 4, Apr. 1997, p. 53
Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.
Primer: Derivatives Instruments, Derivatives Study Center, www.econstrat.org/dscinstruments. htm, printed Jul. 24, 2002, 8 pages.
Chi et al., Principles for information visualization spreadsheets; Computer Graphics and Applications; IEEE; vol. 18; Issue 4; Abstract, Jul./Aug. 1998, pp. 92-99.
Product Data Integration Technologies, Inc., Step Integratin Authors, printed on Apr. 26, 1999.
Sullivan, Scoring Borrower Risk, Mortage Banking, vol. 55, No. 2, Nov. 1994, pp. 94-98.
Spreadsheet Mapper; www.panopticon.com., printed Oct. 1, 2003.
TCS 4.20; Telsys sas; http://download.com, printed Sep. 30, 2003.
McLaughlin, Tapping Web to Search for Right Fund—FundProfiler Speeds Search, Boston Herald, Boston, MA, Dec. 16, 1999, p. 70.
Carey, The Sub-Prime Credit Market: Identifying Good Risks for Unsecured Cards, Credit World, vol. 85, No. 1, Sep. 1996, pp. 13-15.
Portner, There Must be a Better Way, Mortgage Banking, vol. 53, No. 2, Nov. 1, 1992, pp. 12-22.
Trading and Capital-Markets Activities Manual, Instrument Profiles: Structured Notes, Federal Reserve System, The Turin Group, www.toerien.com/books/manual/4040.htm, printed Jul. 24, 2002, 14 pages.
Storms, Phillip, Using Mortgage Credit to Achieve Client Objectives, Journal of Financial Planning, ISSN/ISBN: 10403981, Proquest Document ID: 10403981, vol. 9, Issue 5, 9 pages, Oct. 1996.
Storms, Phillip, Using Mortgage Credit to Achieve Client Objectives, Journal of Financial Planning, ISSN/ISBN: 10403981, Proquest document ID:10403981; Denver: vol. 9; Issue 5; 9 pages, Oct. 1996.
Hickman, Using Software to Soften Big-Time Competition, Bank Systems and Technology, vol. 31, No. 8, Jun. 1994, pp. 38-40.
Spoerri, Visual tools for information retrieval; Visual Languages; 1993; Proceedings; 1993 IEEE Symposium on; pp. 160-168; Abstract.
Spirer, When Bad Credit Behavior Becomes the Norm, Credit World, vol. 85, Iss. 6, Jul./Aug. 1997, p. 18.
Why A Fund of Funds?, Altegris Investments, www.managedinvestments.com/hedge_fund_of_funds, printed Jul. 24, 2002.

* cited by examiner

SMART BORROWING PLANNER

Welcome to the Smart Borrowing Planner
...where smart borrowing begins.

What Is Your Primary Goal?

Please choose the statement that best describes your borrowing goal:

24a — ◉ Lower my interest rates.
24b — ○ Lower my monthly payments.
24c — ○ Obtain credit.

[Continue] — 26

SMART BORROWING PLANNER

Obtain credit

What kind of credit is right for you? What would you like to do? Whether you're looking to make a large purchase or pay for an important event, We offer a variety of solutions to help you meet your needs.

Select any item to learn about borrowing options, and an easy way to apply.

Purchase a car
Finance an education
Make home Improvements
Purchase a home
Cover medical expenses
Buy a second home
Finance a wedding or other large event
Vacation
Other credit needs

Fig. 5

SMART BORROWING PLANNER

For your existing Credit Cards, please complete the following information

Please enter your providers name. We will utilize this information solely for the purpose of the Smart Borrowing Planner.

Please indicate your bank cards and retail store charges:

| Our Card? | Bank/Provider | Interest Rate | Outstanding Balance | Required Min. Monthly Payment | Available Line |
|---|---|---|---|---|---|
| ☐ | ABC Bank | 18 % | $ 7,000 | $ 500 | $ 8,000 |
| ☒ | DEF Bank | 20 % | $ 8,000 | $ 700 | $ 10,000 |
| ☐ | | % | $ | $ | $ |
| ☐ | | % | $ | $ | $ |

☐ Check here if you have more Credit Card entries.

[Continue]  [Reset]

Fig. 6

Personal Lines of Credit

| Bank/Provider | Interest Rate | Outstanding Balance | Required Min. Monthly Payment | Available Line |
|---|---|---|---|---|
| | 20.00% | $9,000 | $750 | $10,000 |
| | Avg. interest rate you are paying: 20.00% | Sub-total: $9,000 | Sub-total: $750 | Sub-total: $10,000 |

SMART BORROWING PLANNER 

Summary of your Current Borrowing

Congratulations! You have now provided all the information necessary to review your personalized borrowing options from the Smart Borrowing Planner. Please take a moment to review the accuracy of the information you have provided. If you need to make any changes you may do so by pressing the "back" button on your browser to return to the "Your Current Borrowing" main input screen.

If you are satisfied with the information you provided, press the "Submit" button below to review you personalized Smart Borrowing Planner options from Chase.

| Credit Cards | | | | |
|---|---|---|---|---|
| Bank/Provider | Interest Rate | Outstanding Balance | Required Min. Monthly Payment | Available Line |
| ABC Bank | 18.00% | $7,000 | $500 | $8,000 |
| DEF Bank | 20.00% | $8,000 | $700 | $10,000 |
| Avg. interest rate you are paying: 19.07% | | Sub-total: $15,000 | Sub-total: $1,200 | Sub-total: $18,000 |

Fig. 7b.1

| Personal Loans | | | | |
|---|---|---|---|---|
| Bank/Provider | Interest Rate | Outstanding Balance | Required Min. Monthly Payment | Term |
| | 30.00% | $6,000 | $2,000 | 15 years |
| Avg. interest rate you are paying: 30.00% | Sub-total | $6,000 | Sub-total $2,000 | Avg. term on Outstanding loans: $10,000 |

Home Equity Lines of Credit

| Bank/Provider | Interest Rate | Outstanding Balance | Required Min. Monthly Payment | Years Remaining in Access Period |
|---|---|---|---|---|
| | 30.00% | $10,000 | $800 | 10 years |
| | Avg. interest rate you are paying: | Sub-total | Sub-total | Number of years remaining in Access Period: |
| | 30.00% | $10,000 | $800 | 10 years |

60

Auto Loans

| Bank/Provider | Interest Rate | Outstanding Balance | Required Min. Monthly Payment | Term |
|---|---|---|---|---|
| | 15.00% | $2,000 | $500 | 10 years |
| | Avg. interest rate you are paying: | Sub-total | Sub-total | Avg. term on Outstanding loans: |
| | 15.00% | $2,000 | $500 | 10 years |

Total Unsecured Credit

| Interest Rate | Outstanding Balance | Required Min. Monthly Payment |
|---|---|---|
| Avg. interest rate you are paying: | Sub-total: | Sub-total: |
| 21.53% | $30,000 | $3,950 |

⎫ 64

Total Secured Credit (not including mortgage)

| Interest Rate | Outstanding Balance | Required Min. Monthly Payment |
|---|---|---|
| Avg. interest rate you are paying: | Sub-total: | Sub-total: |
| 27.50% | $12,000 | $1,300 |

⎫ 66

Total Outstanding Credit (not including mortgage)

| Interest Rate | Outstanding Balance | Required Min. Monthly Payment |
|---|---|---|
| Avg. interest rate you are paying: | Sub-total: | Sub-total: |
| 23.24% | $42,000 | $5,250 |

⎫ 68

[Submit] — 70

Fig. 7b.3

Apply online for a Chase Personal Load
See more detail

Smart Borrowing Planner option for your home equity lines of credit balances: the Chase Home Equity Line of Credit

| | |
|---|---|
| Total current outstanding home equity line of credit balance | $10,000 |
| Current interest rate | 30.00% |
| Interest rate that you would pay with Chase is variable at | Prime+3.75%=12.50% APR |
| Potential monthly payment savings | $1,802 |

Read important notices
Apply online for a Chase Home Equity Line of Credit
See more detail 74d

Fig. 9c

| Fig. 9a | Fig. 9b | Fig. 9c |
|---|---|---|

Fig. 9

SMART BORROWING PLANNER

Your Personalized Smart Borrowing Planner Options

You have just completed the interview stage of The Smart Borrowing Planner. With the information you have provided, we have some Smart Borrowing Planner options to help you "lower your interest rates" based on your previous objective selection.

See how much you can save by transferring your balances to Chase product. Your options are listed below. Beyond this page are additional options of equal importance that may help you save even more through balance consolidation. Compare both sets of options and choose what works best for you.

Smart Borrowing Planner options for your credit card balances:

| | |
|---|---|
| Total current outstanding credit card balances | $15,000 |
| Current interest rate | 19.07% |
| Interest rate that you would pay if you transferred balances to a Chase Platinum credit card | 3.99% |
| Potential total savings in the 9 month introductory period by transferring your outstanding balances to a Chase Platinum card | $1,697 |

Apply online for a Chase Platinum Credit Card
Click here for more detail

Smart Borrowing Planner option for your personal line of credit balances:

| Total current outstanding personal line of credit balances, not including credit card | $9,000 |
| --- | --- |
| Current interest rate | 20.00% |
| Interest rate that you would pay if you transferred balances to a Chase Advantage line of credit | 13.75% |
| Potential monthly payment savings | $570 |

Read important notices
Apply online for a Chase Advantage Line of Credit
See more detail Smart Borrowing Planner option for your personal loan balances:

| Total current outstanding personal loan balances, not including auto loans | $6,000 |
| --- | --- |
| Current interest rate | 30.00% |
| Interest rate that you would pay if you transferred balances to Chase personal loan | 11.49% |
| Potential monthly payment savings | $1,802 |

74b

74c

If you itemize your tax deductions, you may save additional money.

| Estimated Chase home equity monthly payment | $103 |
| Margin tax rate (choose) | 36% ▽ —92 |
| Potential yearly tax savings* | $445 |

*This amount assumes the same monthly interest for 12 months. This amount also assumes that the taxpayer itemizes his deductions and that no limitations on tax benefits apply.

This Worksheet is presented for information purposes and is not intended to constitute tax advice. You should seek the advice and guidance of an experienced tax advisor concerning your specific situation.

[Back]

Fig. 11b

| Fig. 11a | Fig. 11b |

Fig. 11

SMART BORROWING PLANNER

86

$9,000
$7,200
$4,800
$2,400
$0

$9,000 ■ Current payments over 12 months
$1,236 ▨ Proposed payments over 12 months Potential savings over the course of a year, assuming no change to interest rate or balance $8,364

Your Smart Borrowing Planner option: The Chase Home Equity Line of Credit

The Chase Home Equity Line of Credit gives you more of what you deserve:
- Borrow as needed pay interest on the outstanding amount only.
- Flexible payments terms. Can choose the first or fifteenth of the month to make your payment.
- Can pay the line off any time. No pre-payment penalty.
- Interest rate is variable.
- Access credit line by using checks.

[Apply Online Now] 88 for The Chase Advantage Credit Line

Fig. 11a

| | |
|---|---|
| Amount of outstanding balances to consolidate | $3,257 |
| Average current interest rate you are paying on these balances* | 14.38% |
| Interest rate you would pay if you transferred these balances to a Chase Platinum credit card** | 3.99% |
| Potential savings in the 9 month introductory period by transferring your outstanding balances to a Chase Platinum card*** | $254 |

*Your current interest rate is calculated as a weighted average based on the rates and balances you provided.

**Represents an introductory rate valid only during the first 9 months that you have your card. After the nine month introductory period, Chase provides a very competitive rate. Refer to important notices for details.

***The savings calculated assumes that the interest rate that you are currently paying and the balance you would transfer remains the same for a nine month period.

Read important notices
Apply online for a Chase Platinum Credit Card
See more details 96b

Fig. 12c

| Fig. 12a |
|---|
| Fig. 12b |
| Fig. 12c |

SMART BORROWING PLANNER

More Smart Borrowing Planner Options from Chase

The options you see below are based on consolidating your current borrowing to a Chase product. By consolidation you current borrowing, you may reduce your interest rate or monthly payment even further and save even more money. If you more than one option, please choose the one that works best for you.

Smart Borrowing option(s) for your overall credit balances - credit not secured against any personal assets, such as your home or car:

Consolidate $3,257 of your outstanding personal credit balance to a Chase Personal Loan and save.

| Amount of outstanding balances to consolidate | $3,257 |
|---|---|
| Average current interest rate you are paying on these balances* | 14.38% |
| Interest rate that you would pay if you transferred balances to Chase Personal Loan | 11.49% |
| Potential monthly payment savings** | $26 |

*Your current interest rate is calculated as a weighted average based on the rates and balances you provided. Should you decide to transfer your balances to Chase, We recommend that you transfer your higher interest rate accounts.

**The potential monthly savings are calculated by subtracting the estimated required minimum monthly payment with Chase from your current required minimum monthly payment.

Read important notices
Apply online for a Chase Personal Loan
See more details

Smart Borrowing Planner option(s) for your overall credit balances — credit not secured against any personal assets, such as your home or car:

Consolidate $3,257 of your outstanding personal credit balances to a Chase Platinum Credit Card and save.

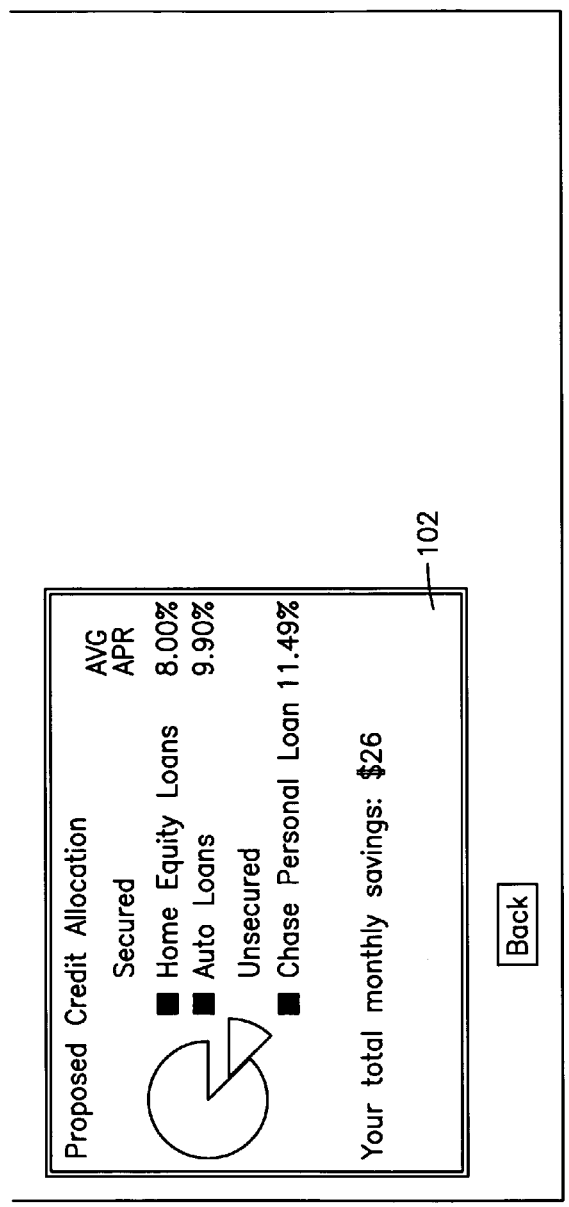
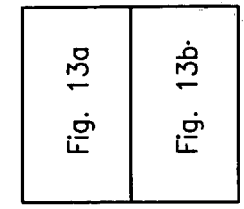
Fig. 13b
Fig. 13

Fig. 13a

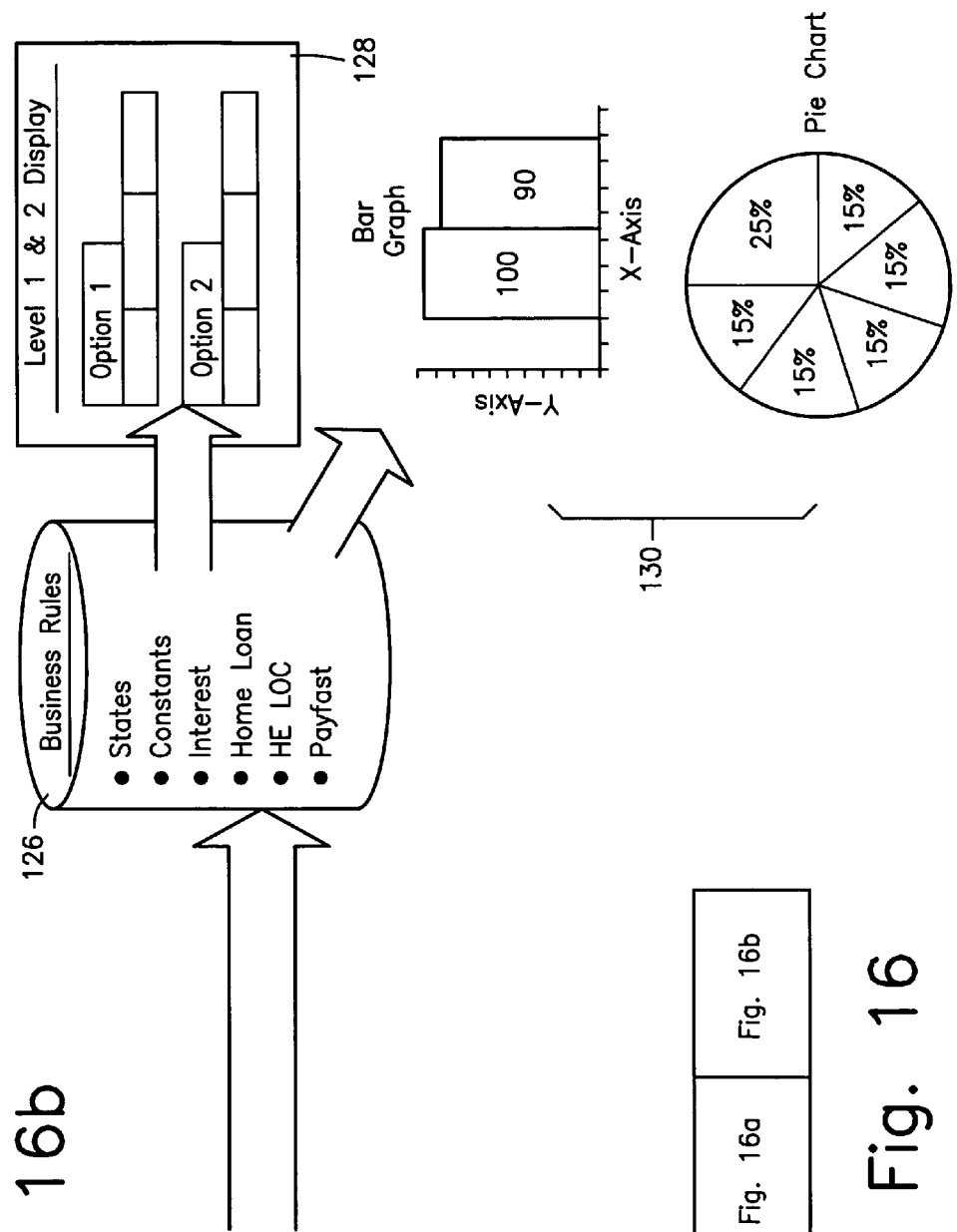

NETWORK-BASED FINANCIAL PLANNING SYSTEM AND METHOD

CROSS-REFERENCE TO RELATED APPLICATION

This application is related to and claims priority to U.S. Provisional Patent Application No. 60/157,142 entitled ON-LINE FINANCIAL PLANNER, filed Sep. 30, 1999, the contents of which are incorporated herein by reference.

BACKGROUND OF THE INVENTION

1. Field of the Invention

The present invention relates to a financial planning system and method which optimizes credit opportunities for a user, and in particular, to a network-based method and system which allows a user to input their credit profile and financing objectives and provides a detailed group of financing options and information to the user including the ability to apply for financing on-line.

2. Related Art

The proliferation of global computing via global communication networks such as the Internet has facilitated many aspects of electronic financing applications. Among these applications are those which provide a user with the ability to review their current financial situation in light of other available financing opportunities.

For example, many banks and other lending institutions provide access to on-line financial calculators which provide a user with an estimated loan payment amount given a set of input criteria such as principal amount, repayment term and interest rate. Typically, these loan calculators are integrated as part of Internet webpages provided by the financial institution. Loan calculators, however, do not take into account a user's financing objectives, do not offer a comparison of the user's current situation with financing products designed to meet the user's objectives and do not offer a comprehensive view of the user's credit situation.

Other financial institutions offer product routers on their website which direct a user to a particular product based on a simple set of input criteria. For example, a user who indicates an interest in obtaining a credit card might be routed to a series of credit card related webpages which advertise the financial institution's credit card offerings.

Some websites are more sophisticated, routing a user to a product based on the user's specific credit request. For example, a user might input that she seeks an automotive finance loan for a 60 month term for a loan amount of $20,000 toward a vehicle whose purchase price is $25,000. The routing algorithm in the financial institution's web server directs the user to a product which meets the user's stated requirements. However, routing websites do not take into account the user's current credit situation along with the user's stated credit objectives to determine a particular set of products which meet all the user's requirements. Further, these websites do not provide comprehensive debt consolidation options which meet the user's objectives while simultaneously allowing the user to reduce the quantity of institutions and accounts providing financing.

Still other financial institutions provide websites which accept input criteria relating to the user's income and current expenses in order to calculate the extent to which the user can borrow additional funds. The user may be offered the opportunity to contact the financial institution to learn more about the financial institution's product offerings.

These systems, however, do not provide a user with a comprehensive view of their current credit situation by comparison with those products which are offered by the financial institution which will save the user money or lower the user's monthly payments. These systems also do not base product recommendation on a user's credit history or establish a recommendation based on meeting the user's objectives over a predetermined period of time. In addition, these systems do not allow the user to apply for credit or loans on-line within the same browsing session. Further, these systems do not allow the user to obtain detailed debt consolidation options which will save the user money as compared with the user's current credit profile.

In sum, it is desirable to have a system and method which allows a user to use a standard web browser to input their credit profile and credit objectives, view a comprehensive summary of their credit picture and receive a display generated using a set of business rules which matches the user's credit situation and objectives against current product offerings. The result provides a detailed comparison of the user's current loans and credit accounts with those offered by the service provider so that the user can easily compare the offerings. In addition, there is no system which allows a user to obtain additional information in the form of debt consolidation in which their current credit situation is compared against a consolidation package offered by the service provider based on the user's input. Finally, there is no financial planning system which offers the above-described desirable elements and which also allows a user to apply for credit and loans on-line during the same browsing session.

SUMMARY OF THE INVENTION

The present invention advantageously provides a comprehensive system by which a user inputs data relating to their current credit situation and also indicates a financing objective. The system advantageously accepts this data and, using a set of business decision rules, considers the user's credit data in conjunction with products offered by the service provider, thereby providing the user with a credit financing opportunity list presented in the form of a multi-level view. The multi-level view compares their current credit profile with products offered by the service provider which will meet the user's objective, i.e., save the user money by lowering their interest rate or lowering monthly payments, etc.

The multi-level display preferably includes a summary view of the available options, and allows the user to obtain detailed information, in the form of graphs, charts, and the like, so that the user can determine which proposed option, if any, is beneficial to them. Further, the present invention allows the user to apply on-line for those products for which the user is interested.

As an aspect of the present invention, a method for allowing a user of a user terminal to receive credit financing opportunities is provided in which credit data is received from the user terminal. The credit data includes a user objective and a credit profile. Credit financing opportunities are determined based on the credit data and at least one predetermined decision rule. An output is generated in which the output includes a comparison of at least part of the credit profile with the determined credit financing opportunities. The output is provided to the user terminal.

As still another aspect, the present invention provides a computer readable storage medium storing computer executable instructions which, when executed, perform a method for allowing a user of a user terminal to receive credit financing opportunities, in which credit data is received from the user terminal. The credit data includes a user objective and a credit profile. Credit financing opportunities are determined based on the credit data and at least one predetermined decision rule. An output is generated in which the output includes a comparison of at least part of the credit profile with the determined credit financing opportunities. The output is provided to the user terminal.

As still yet another aspect, the present invention provides an information processor in a financial processing system, in which the information processor is coupled to at least one user terminal via a communication network, the information processor has a memory storing at least one decision rule. A network interface couples the information processor to the communication network. A central processing unit performs the functions of:

receiving, via the network interface, credit data from the user terminal, the credit data including a user objective and a credit profile;

determining credit financing opportunities, the determination being based on the credit data and at least one predetermined decision rule;

generating an output, the output including a comparison of at least part of the credit profile with the determined credit financing opportunities; and providing the output to the user terminal.

The present invention also includes an aspect in which a method for allowing a user of a user terminal to apply for a credit financing opportunity via a communication network is provided in which a user objective is received from the user terminal in which the user objective indicates that the user wishes to obtain credit. A list of potential financing products is provided to the user terminal. A request is received from the user terminal for information corresponding to a selected one of the potential financing products. The information is provided to the user terminal. A request is received from the user terminal to initiate an application for the selected financing product.

Other features and advantages of the present invention will become apparent from the following description of the invention which refers to the accompanying drawings.

BRIEF DESCRIPTION OF THE DRAWINGS

FIG. 5 is an example of a credit option display screen presented on a user terminal.

FIG. 6 is an example of a credit input display screen presented on a user terminal;

FIG. 9, comprised of FIGS. 9a, 9b and 9c, is an example of a level one output display screen presented on a user terminal;

FIG. 11 is an example of a detailed display screen relating to a home equity line of credit presented on user a terminal;

FIG. 12 is an example of a level two output display screen presented on a user terminal;

FIG. 13 is an example of a detailed consolidation option display screen presented on a user terminal;

DETAILED DESCRIPTION OF EMBODIMENTS OF THE INVENTION

Figure 1:
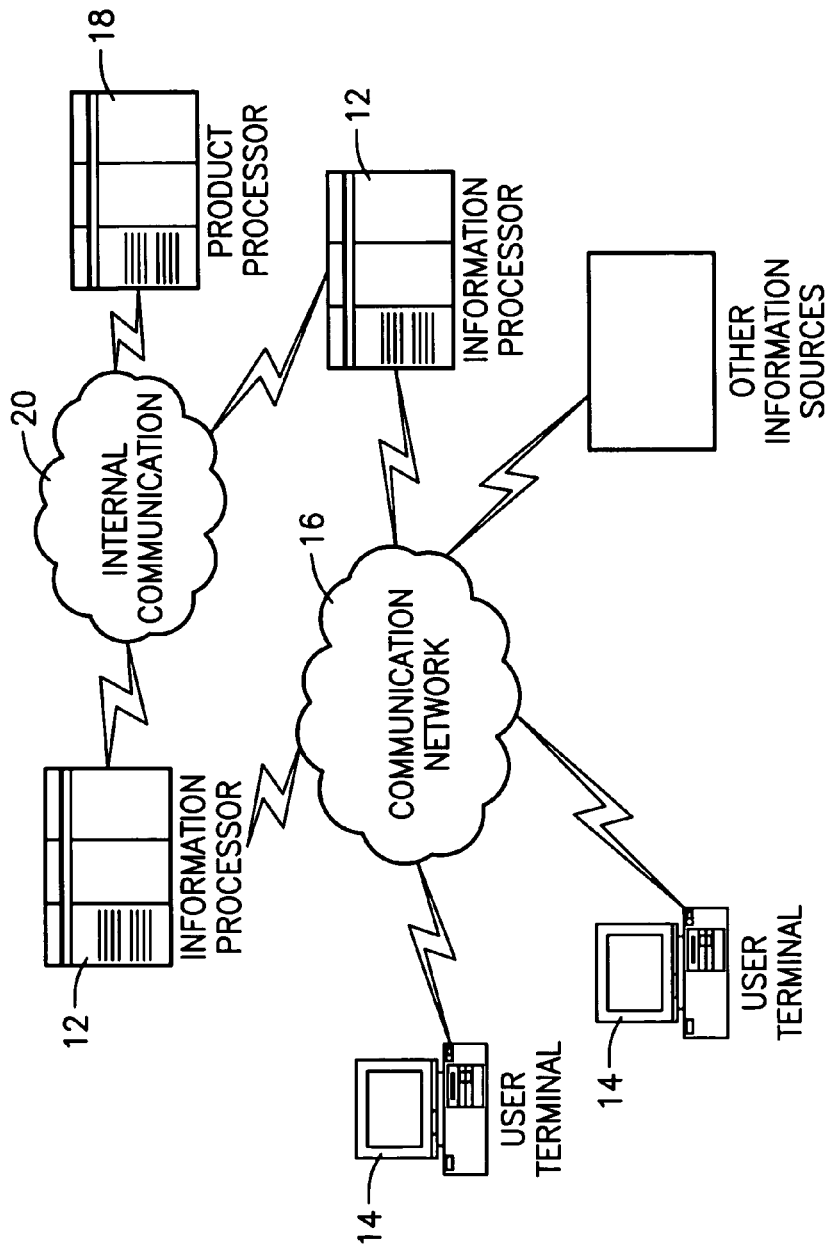
FIG. 1 is a diagram of the hardware elements of a financial planning system constructed in accordance with the principles of the present invention.

Referring now to the drawing figures in which like reference numbers refer to like elements, there is shown in FIG. 1 a financial planning system constructed in accordance with the principles of the present invention and designated generally as "10". Financial planning system 10 is preferably comprised of one or more information processors 12 communicating with one or more user terminals 14 via a communication network 16. Communication network 16 can be any communication network, whether private or public, but is preferably the Internet. Financial planning system 10 optionally includes one or more product processors 18 coupled to information processors 12 via internal communication network 20.

Product processors 18 support one or more financial services products, such as credit cards, secured loans, unsecured loans, lines of credit, mortgages and the like. Product processors 18 provide support for users' accounts and preferably include a database to maintain all relevant account data. Product processors 18 provide data to information processors 12 relating to those financing opportunities, i.e. products supported by the respective product processor. Information processors 12 use this data when preparing a list of potential financing opportunities to be considered. Information processors 12, by being connected to communication network 16, preferably has access to other information sources 15 which can be considered when preparing the above list of potential financing opportunities presented to the user. The inclusion of outside information sources helps to maintain trust among the users by non-biasing the products offered. Other information sources may be required to pay a fee to be included in the selection process. Of course, the functions implemented by product processors 18 can be implemented on information processors 12, thereby obviating the need for product processors 18 and internal communication network 20.

Internal communication network 20 can be any communication network capable of transporting data between information processors 12 and product processors 18. Internal communication network 20 is preferably secured from communication network 16 such that user terminals 14 can not directly access product processors 18.

Figure 2:
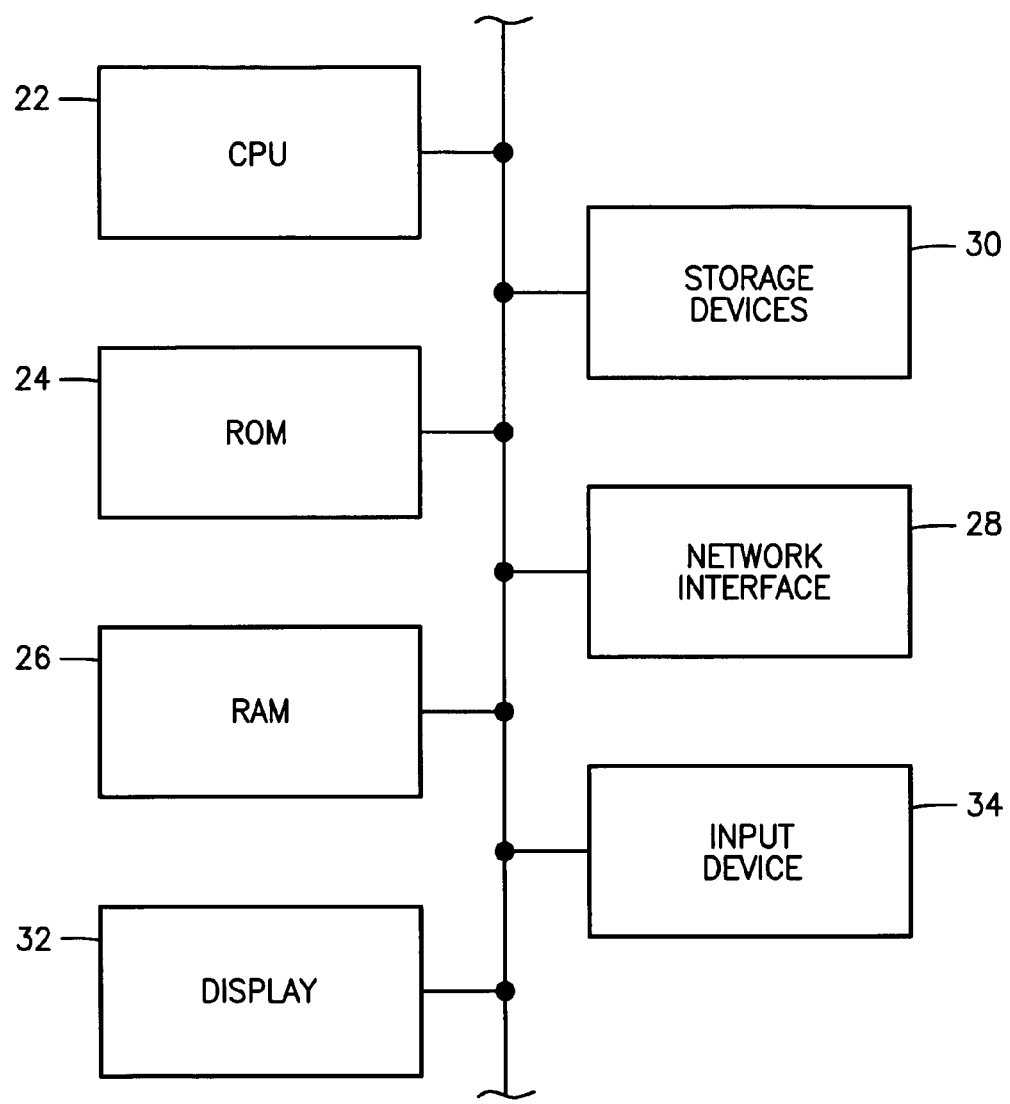
FIG. 2 is a block diagram of the functional elements of a user terminal, an information processor and a product processor constructed in accordance with the principles of the present invention.

Referring to FIG. 2, the functional elements of information processors 12, user terminals 14 and product processors 18 preferably include a central processing unit (CPU) 22 used to execute software code in order to control the operation of the processor, read-only memory (ROM) 24, random access memory (RAM) 26, at least one network interface 28 to transmit and receive data to and from other computing devices across communication networks 16 and 20. Information processors 12, user terminals 14 and product processors 18 also include one or more storage devices 30 such as a hard disk drive, floppy disk drive, tape drive or CD-ROM for storing program code, database and application data, a display 32, and one or more input devices 34. Input devices 34 include mice, keyboards, track balls, pens and other devices suitable for entering data into a computer or selecting portions of the screen on display 32.

The various components of information processors 12, user terminals 14 or product processors 18 need not be physically contained within the same chassis or even be located in the single location. For example, storage devices 30 may be located at a site which is remote from the remaining elements of the processor or terminal, and may even be connected to CPU 22 across communication network 16 or 20 via network interface 28.

Each information processor 12 receives, processes, distributes and transmits data to and from user terminals 14 and product processors 18. Information processors 12 preferably include software which allows information processors 12 to function as web servers, responding to queries and providing HTML, Java, Active-X control programs and the like to user terminals 14 via communication network 16.

It is contemplated that the capacities of the various functional elements of information processors 12, user terminals 14 and product processors 18 are sized according to expected demand. Information processors 12 also preferably function as application servers, executing the functions necessary to process data received from user terminals 14 and product processors 18, thereby providing the desired output for display on user terminal 14.

User terminals 14 can be any device capable of communicating with information processors 12 across communication network 16, including a desktop or laptop personal computer, personal digital assist (PDA) or other hand-held computing device, Web-TV, and the like. A significant aspect of the preferred embodiment of system 10 is that it does not require that user terminals 14 be capable of any functions other than communicating with information processors 12 using communication software such as a standard Internet web browser. Instead, all software and data specific to the operation of system 10 are stored in information processors 12, or gathered by information processors 12, themselves.

As used herein, references to displaying data on user terminal 14 refer to the process of communicating data to user terminal 14 across communication network 16, and processing the data such that the data can be viewed on display 32 corresponding to user terminal 14 using an Internet web browser or the like.

In this preferred embodiment, certain applets such as Java applets, Active-X control programs and the like are stored on information processor 12 and sent to user terminals 14 for execution by the web browser software. In this manner, components of system 10 which require execution on user terminal 14 are stored on information processor 12. The web browser interface on user terminals 14 can, therefore, be customized by a Java applet, Active-X control program and the like sent from information processor 12 to user terminal 14. This allows upgrades and enhancements to system software components to be easily distributed and obviates the need to have a technician travel to location of user terminal 14 for software upgrades.

The nature of the invention as such that one skilled in the art of writing computer executable code (software) will be able to implement the desired functions using one or a combination of popular programming languages, for example C++, Java, Hypertext Mark-Up Language (HTML) and other known database manipulation languages.

Figure 3:
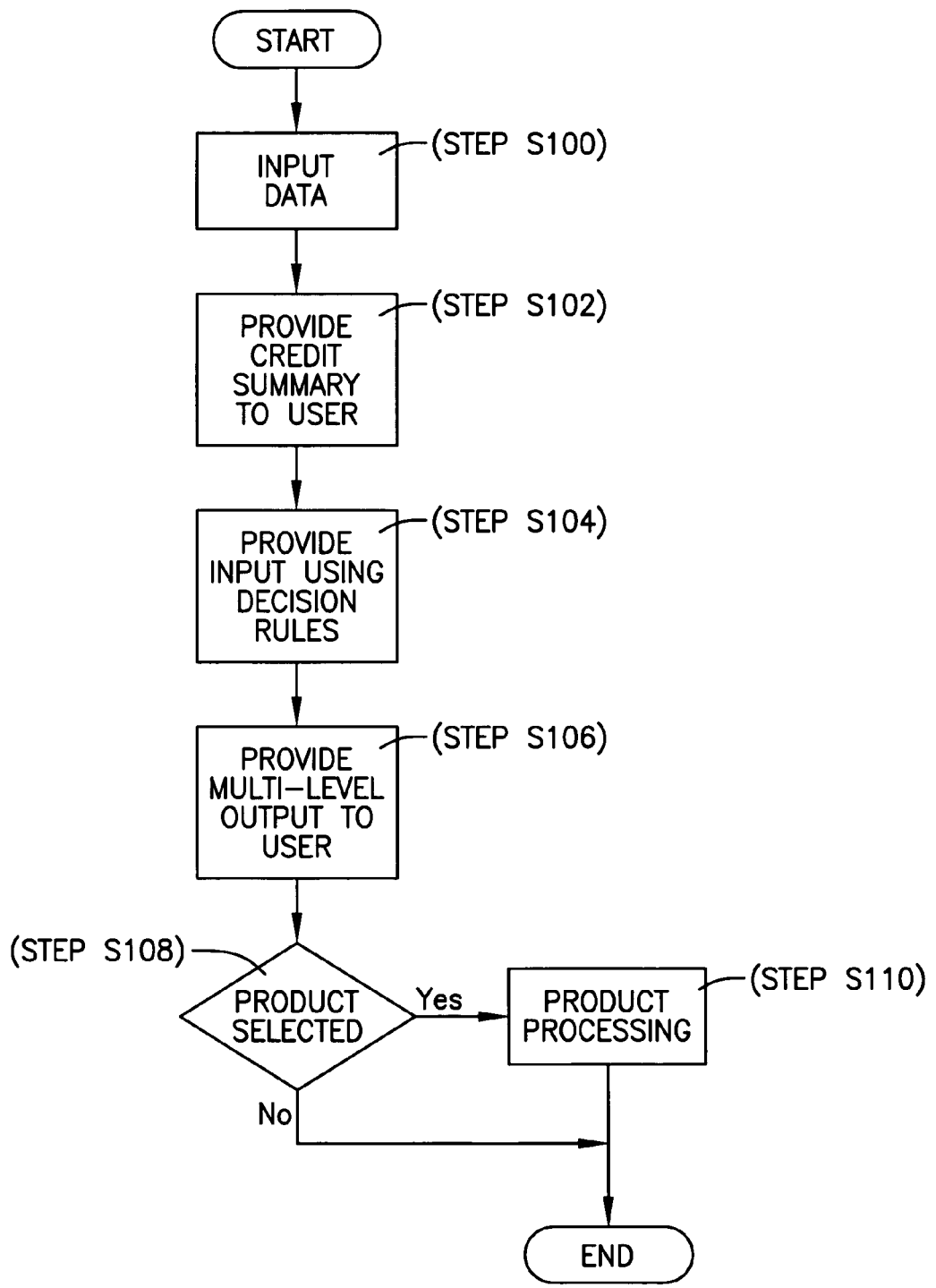
FIG. 3 is a flow chart of the general operative process of the present invention.

The overall operation of system 10 is explained with reference to the flow chart shown in FIG. 3. Upon establishing communication with an information processor 12, the user is prompted to input user data (step S100). Input can take the form of radio buttons, selections from pull-down menus or alpha-numeric entries into forms, such as HTML forms, provided on the display of user terminal 14. Data input can be at least partially performed automatically by querying a data bank or other suitable interface which can provide at least some of the required input (i.e. credit information from credit reporting agencies or information from a past visit to the site). If the data is entered by referring to an outside source, it is preferably that the user be given the opportunity to check the input for accuracy and to make the appropriate corrections. User data includes identification of the user's primary financing objective as well as a complete credit profile. The user's credit profile preferably includes one or more of credit card data, vehicle (automobile) loan data, secured and unsecured debt data, home equity data, and residential mortgage data.

Figure 4:
FIG. 4 is an example of an objective entry display screen displayed on a user terminal.

FIG. 4 shows an example of objective entry display screen 22, displayed on user terminal 14 as the user initiates interaction with financial planning system 10. Objective entry display screen 22 includes objective indicator area 24 from which the user enters a borrowing goal. For example, objective indicator area 24 includes lowering interest rate goal 24a, lowering monthly payment goal 24b and obtaining credit goal 24c. In the example shown in objective entry display screen 22, the user indicates a preference by selecting an appropriate radio button. Of course, any financial goal can be listed and it is contemplated that the invention is not limited to the three objectives shown in FIG. 4.

Upon indicating an objective, the user selects continue button 26 which causes input objective data corresponding to the selected objective to be sent to information processor 12.

In the case where the user is interested in obtaining credit, for example by selecting obtain credit goal 24c in FIG. 4, the user is presented with obtain credit display screen 28 as shown in FIG. 5. Obtain credit display screen 28 provides a user with credit option list 30. Credit option list 30 is preferably a list of links, from which a credit option can be selected to learn more about that particular option. Examples of credit options for which a user can obtain additional information include purchasing car, financing an education, making home improvements, purchasing a home, covering medical expenses, buying a second home, financing a wedding or other large event, vacation or any other credit need.

Selecting an item from credit option list 30 causes a display screen or series of display screens to be presented on user terminal 14 (not shown) which provide detailed information about the selected item.

In the case where the user wishes to lower interest rates or monthly payments by selecting goals 24a or 24b the user is prompted to enter additional user data such as those described above relating to credit cards, home equity lines of credit, etc.

FIG. 6 shows an example credit input display screen 32 by which the user enters user credit data. Although the example shown in FIG. 6 is for credit card data, it should be understood that similar display screens are used for other types of credit information, such as lines of credit, outstanding mortgages, automobile loans, etc.

Credit input display screen 32 preferably includes provider name entry area 34 and corresponding interest rate entry area 36, outstanding balance entry area 38, minimum monthly payment entry area 40, available line of credit entry area 42 and service provider card indicator 44. For each provider, the user enters the corresponding interest rate in interest rate entry area 36, the outstanding balance of the credit card in outstanding balance entry area 38, the minimum required monthly payment for that card in minimum monthly payment entry area 40 along with the total available line of credit for the corresponding card in available line entry area 42. In addition, the user preferably indicates whether the credit card is issued by the provider of system 10 by making an indication in service provider card indicator 44.

The user continues to enter credit data for their credit cards until all data has been entered.

The user can indicate that they have additional credit cards to enter by making an indication in additional entry area 46. When all data pertaining to the credit cards has been entered, the user selects continue button 48. The user can reset credit input display screen 32 by selecting reset button 50. Of course, if the user has no credit cards they can merely select the continue button. The data entered into areas 34-44 for each of the different types of credit along with the user's credit objective as indicated in objective indicator area 24 comprises the user input data.

Referring again to FIG. 3, upon completion of entry of all user input data for each type of credit, information processor 12 generates and provides a credit summary to the user via user terminal 14 (step S102). The credit summary is created based on the user input data and is presented to the user in an easy to read report which quickly enables the user to see a snapshot of their current credit profile.

In an alternate embodiment, user data input (step 100) is entered automatically by querying an appropriate data source (i.e. credit report, another application or a prior visit, etc.). The entered information is displayed on user terminal 14 providing the user with an opportunity to inspect the information for accuracy and to make any necessary corrections. The user also has the opportunity to manually add any new or missing information in the same manner as outlined above.

Figure 7A:
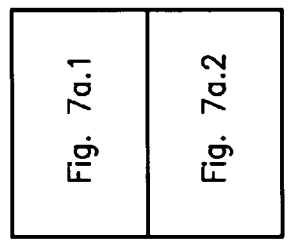
FIG. 7, comprised of FIGS. 7a and 7b, is an example of a summary display presented on a user terminal.
Figure 7B:
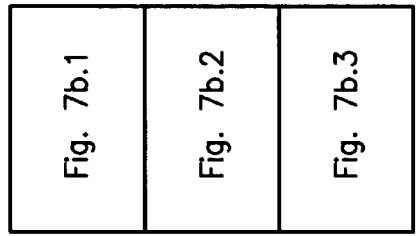

FIG. 7, comprised of FIGS. 7a and 7b, shows an example of a summary display generated by information processor 12 and displayed on user terminal 14. Credit summary display screen 52 preferably includes a summary of each of the various types of credit for which the user entered input data. In the case where credit summary display screen 52 is too large to be displayed in its entirety on the display user terminal 14, the web browser or operating system preferably implements known window scrolling techniques so that the user can view the entirety of their credit summary.

As shown in FIG. 7, summary areas preferably include credit card summary area 54, personal lines of credit summary area 56, personal loans summary area 58, home equity lines of credit summary area 60, auto loans summary area 62, and total outstanding credit summary area 68. Of course, those credit areas for which no input data was entered are not displayed. Total outstanding credit area 68 represents a compilation of the user's total credit, preferably not including mortgage data.

Each of summary areas 54-68 provide a summary including: data for each provider, the interest rate, outstanding balance, required minimum monthly payment and available credit line, where appropriate, along with corresponding averages within each area. The user therefore advantageously receives a view of their entire credit situation. The user can go back and make changes, or if satisfied, selects submit button 70 to enter the user data into the decision engine provided by information processor 12.

Selecting submit button 70 indicates to information processor 12 that the user is satisfied with their input data and wishes to continue. Upon receiving this indication, information processor 12 processes the input data using a comprehensive set of decision rules (step S104) to determine a recommended set of one or more products which will meet the user's objective as indicated in objective indicator area 24.

The business decision rules implemented according to the present invention carefully consider the user's objective in light of their credit situation. For example, a user who is currently paying a 9.9% interest rate on a credit card will not be offered a credit card with an interest rate of 15% in the case where the user's objective is to lower interest rates. However, this option may be offered if it will result in a lower monthly payment if that is the user's objective.

Alternatively, it is contemplated that the processing step (step S104) can include obtaining the user's credit history i.e., credit worthiness report, either from within the records contained by the provider of system 10 or by electronically requesting the credit history from a third party vendor if not automatically entered in step 100 as discussed above. The credit history is then considered along with the user provided credit data and objectives when determining which products to offer. For example, a user with an excellent credit history will be offered better rates for competing products than a user whose credit history is not as good.

It is contemplated that there will be situations where a product offered by the provider of system 10 is not as good as the user's current product, i.e., the product will not meet the user's credit goal. In these cases, those products will not be offered to the user since nothing should be done to damage the user's confidence in the system.

An example of a typical decision rule implemented by information processor 12 is explained. Suppose that a user has an outstanding unsecured balance other than on her credit cards and that her goal is to lower her interest rate, i.e., save money. Information processor 12 will check to make sure that the sum of the outstanding credit card balances does not exceed the maximum available line of credit for a credit card offered by the provider of system 10. Information processor 12 will then check to determine whether the average monthly interest rate on the service provider's credit card with the transferred unsecured balances is less than the average monthly interest rate payment being currently paid by the user.

Preferably, information processor 12 also checks to determine that the user will save a predetermined amount of money over a predetermined period, for example at least $50.00 over nine months. If the user will save the predetermined amount over the predetermined time period, that option is considered viable and will be offered to the user. It should be noted that, in the case where the user has provided enough profile information to enable a determination as to the user's credit worthiness, for example via a credit check, the credit card offered by the service provider for which the user is qualified can be selected based on the user's credit worthiness. Of course, any additional factors may be considered during the rules processing step.

A set of rules tailored to the service provider's lending criteria are applied to each of the user's different types of credit for comparison with the types of credit offered by the provider of system 10.

Although the decision rules are based on the service provider's lending criteria, the decision rules are also derived to take the user's financing objective into account. For example, no solution will be presented to the user which does not accomplish the user's stated financing objective.

Examples of service provider lending criteria include but are not limited to, whether the product is offered in the user's stated geographic area, whether the product satisfies the user's preference for either security of fixed monthly payments and interest rates for loans or more flexible borrowing such as lines of credit and whether the product satisfies the requested borrowing amount. In the case of the latter, whether the requested borrowing amount exceeds allowable minimums and maximums.

For many products, including home equity products, the determination of whether the requested borrowing amount exceeds allowable minimums and maximums involves calculating the available equity in the user's home and comparing it to the user's requested borrowing need. For these products, the decision rules are preferably arranged to provide spillover options in the case where the user does not have enough equity to meet the user's requested borrowing needs. For example, an unsecured loan option might be presented to the user in combination with a home equity loan. Regardless, spillover options will not be presented to the user if the options do not meet the user's stated financing objective.

Also, where there is more than one product within one product set that satisfies the user's objective and meets set criteria with home equity lines of credit, the rules preferably default to the more favorable product for the user, i.e. the product with the greatest monthly savings or lowest interest rate, depending on the user's stated financing objective.

It should be noted that, if the aggregate requested financing amount cannot be met, the decision rules are arranged such that products are reviewed in reduced sets, thereby allowing the user to potentially achieve as much of the stated objective as possible.

In addition, it is also contemplated that taxation implications can be considered in the case where the user's credit profile includes a home equity line of credit, home equity loan, first mortgage, or other indication that the user has real estate against which they can borrow. Preferably, the potential tax savings simply defaults to a common tax bracket displaying the tax consequences of the option based on a "typical" tax-payer. The user then has the option to enter her specific tax bracket to customize the results and display the actual tax savings based on the inputed data.

Upon completion of decision rules processing (step S104), information processor 12 provides a multi-level output to the user (step S106), preferably in the form of HTML and/or Java or Active-X control program data. The multi-level output provides the user with a product-by-product comparison of those products provided by the provider of system 10 which will meet the user's stated objectives based on their user input data. The multi-level output is explained in greater detail below.

The multi-level output provides the user with the ability to select a particular product in the case where the user wishes to make an application for that product (step S108). For example, the user may be interested in applying for a personal line of credit which will save them money (or lower their monthly payments) as compared with their current personal line of credit. In that case, the user indicates that they wish to make an on-line personal line of credit application, preferably by selecting an appropriate link from the output display. In that case, information processor 12, in conjunction with product processor 18 if necessary, prompts the user to enter appropriate application data, and processes the application in accordance therewith to provide the user with an indication as to whether they qualify for the requested product (step S110). Systems for accepting on-line loan applications are known.

The present invention, therefore, provides a user with the ability to quickly enter their credit data and objectives by which a summary of their credit profile is provided to them along with a multi-level display of products which meet the user's stated objectives given their current credit situation. Further, the present invention conveniently and advantageously allows the user to select one or more of the offered products in order to apply for that product electronically. As such, the present invention advantageously eliminates the need for the user to visit or telephone the financial institution in order to determine which products meet the user's needs.

The multi-level output operation of step S106 is described in detail with reference to the flow chart of FIG. 8. Upon completion of processing as set forth in step S104, the present invention displays a comparison of the user's current financing products with those offered by the service provider which meet the user's stated objectives (step S112). This product-by-product comparison within the context of the user's objective, is referred to as the level one display.

The level one display is preferably a textual or textual/graphical, i.e., pictorial output which allows the user to quickly determine which, if any, of the service provider's products are compelling and warrant more detailed investigation on the part of the user. An example of a level one output display screen is shown in FIG. 9, comprised of FIGS. 9a and 9b. As is shown in FIG. 9, level one output display screen 72 is comprised of comparison areas 74a, 74b, 74c and 74d. Each of output comparison areas 74a-74d compares a type of credit which is currently part of the user's profile with a product offered by the provider of system 10 which meets the user's stated objectives. Although FIG. 9 shows four separate areas 74a-74d, level one output display screen 72 preferably shows as many or as few areas as are needed to offer relevant products.

The user therefore obtains a snapshot of the potential products given their financing objectives. For example, referring to FIG. 9a, output comparison area 74b shows that the user's personal line of credit balances which currently total $9000.00 at a 20.00% interest rate can be converted to a line of credit account offered by the provider of system 10 at a 13.75% interest rate, yielding a potential monthly payment saving of $570.00.

In addition, level one output display screen 72 preferably allows the user to: read notices relating to the particular product, for example by selecting notice links 76, apply for the particular product on-line by selecting application link 78 or see additional details by selecting details link 80.

It is preferred to include links to "read important disclosure information" with all products offered. A user is given an opportunity to review the important disclosure information specific to each product. Additionally, links are preferably provided leading the user to additional information if desired and an "apply now" link to provide the user the opportunity to apply for a product on-line.

Figure 8:
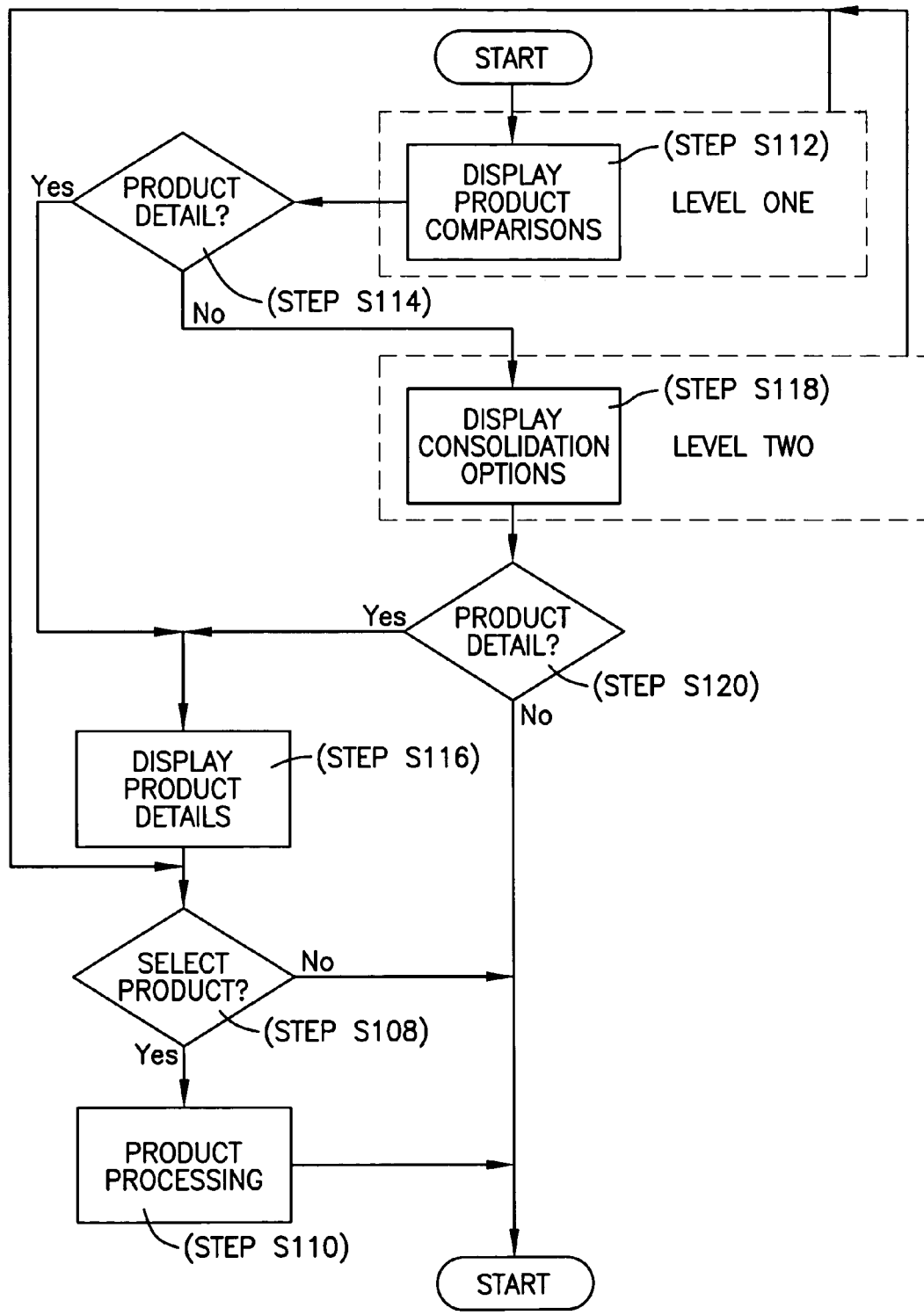
FIG. 8 is a flow chart of the multi-level output operation of the present invention.

Additional details provided as steps S114 and S116 as shown in FIG. 8 are performed, for example, when the user selects details link 80.

Figure 10:
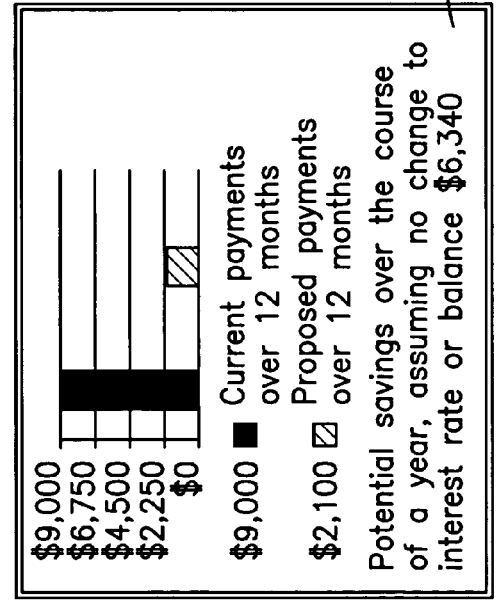
FIG. 10 is an example of a detailed product display presented on a user terminal.

FIG. 10 shows an example of a detailed product display, displayed on user terminal 14 when the user selects details link 80. As shown in FIG. 10, credit line detail display screen 82 includes graph 84 which provides a pictorial view of the comparison between the user's current payments and the payments which will result if the user signs up for the service provider's credit line product. In addition, credit line detail display screen 82 preferably includes application link 78.

FIG. 11 shows another example of a detailed display screen relating to a home equity line of credit, presented on the display of user terminal 14 when the user selects a corresponding details link from level one output display screen 72. As shown in FIG. 11, home equity detail display screen 86 includes a graph showing a pictorial view of the user's potential savings and home equity application link 88.

Home equity detail display screen 86 also preferably includes tax implication area 90. By the user providing a tax rate in tax rate area 92, information processor 12 determines the potential yearly tax savings which will result from the user's enrollment in the proposed home equity line of credit, home equity loan or mortgage product. Areas similar to tax implication area 90 are preferably provided on those product detail display screens for products in which tax savings can result. For example, home equity lines of credit, home equity loans and other real property mortgages.

Although FIGS. 10 and 11 show a graph as the pictorial means of comparison, it is contemplated that any pictorial representation can be used, for example, pie charts and the like.

Referring again to FIG. 8, in the case where the user does not wish to receive product details in step S114, the user can select an appropriate link on level one output display screen 72 to receive a level two output. Requesting a level two display causes information processor 12 to generate and display debt consolidation options on user terminal 14 (step S118). However, the system is preferably arranged such that the level two display is made available only if balance consolidation will further enable the user to meet their financing objective, for example, provide additional savings when compared with the individual product comparisons shown in the level one display.

FIG. 12 shows an example of a level two output display screen. Level two output display screen 94 advantageously provides the user with a comprehensive set of financing options which will allow the user to consolidate current debt while simultaneously meeting the user's financing objectives.

For example, level two output display screen 94 as shown in FIG. 12 comprises consolidation areas 96*a* and 96*b*. The consolidation option shown in consolidation area 96*a* will potentially save the user $26.00 by consolidating the user's outstanding personal credit balances to a personal loan offered by the provider of system 10. As another example, the option illustrated in consolidation area 96*b* will allow the user to potentially save $254.00 over a nine month introductory period by refinancing the user's outstanding personal credit balances to a credit card offered by the provider of system 10.

Consolidation areas 96*a* and 96*b* preferably provide information regarding outstanding balances, current interest rates, proposed interest rates and potential savings arranged in a manner similar to those provided in level one output display screen 72. In addition, similar to level one output display screen 72, level two output display screen 94 provides the user with the ability to read important notices, apply for the offered product on-line, or obtain additional details for the proposed option.

Referring again to FIG. 8, if the user wishes to view additional details about a particular consolidation option (step S120) the user can select a link or otherwise indicate such. Product details for the selected consolidation option are then displayed in a manner similar to that for a level one display product (step S116).

Figure 13A:
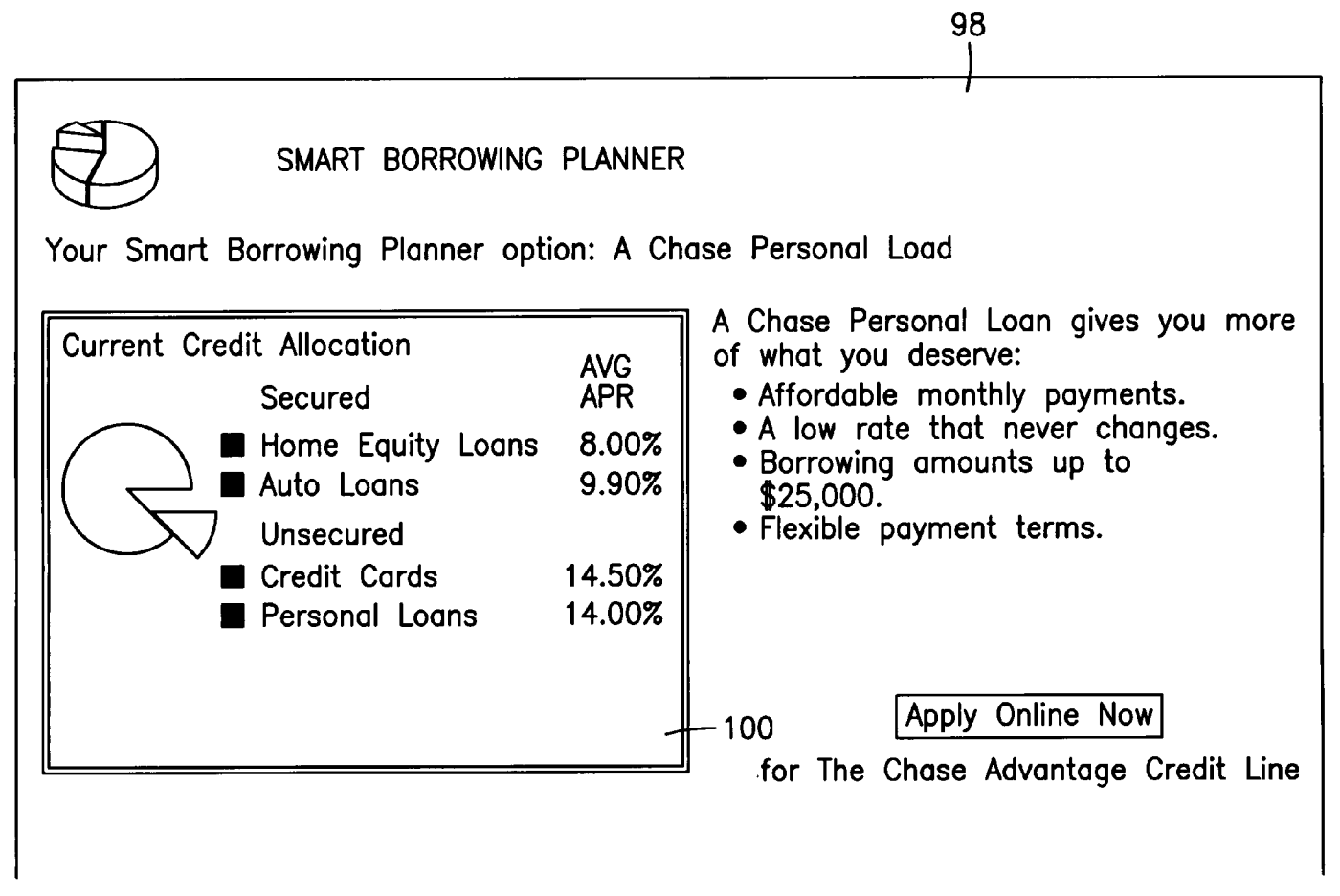

An example of a consolidation option detail display screen is shown in FIG. 13. Consolidation option detail display screen 98 preferably shows a pictorial view of the user's current credit allocation and proposed credit allocation based on the service provider's proposed consolidation option. For example, consolidation option display screen 98 as shown in FIG. 13 includes current credit allocation pie chart 100 and proposed credit allocation pie chart 102. Current credit allocation pie chart 100 provides a breakdown of the user's current credit allocation, including the user's average annual percentage interest rate. Proposed credit allocation pie chart 102 shows the user's credit allocation and corresponding average annual percentage interest rates if the user accepts the service provider's proposal. Consolidated option detail display screen 98 also preferably includes a link which, when selected, allows the user to apply for the proposed consolidation option.

Referring again to FIG. 8, and as discussed above, the user can select a proposed product (step S108) to invoke product processing (step S110) for the selected product.

The operation of information processor 12 in the case where the user indicates a borrowing goal as lowering interest rates or lowering monthly payments as depicted by elements 24*a* and 24*b*, respectively, in FIG. 4 is explained with reference to FIG. 14. As discussed above, the user is prompted in step S100 (see FIG. 3) to input certain data. This user input data preferably corresponds to one or more of user objective 104, user credit profile 106 and user personal information 108.

User objective 104 corresponds to the user's selected primary goal as set forth in objective indicator area 24. User credit profile 106 is comprised of the particular credit data relating to current user credit accounts, for example residential mortgage information, credit cards, secured and unsecured loans, auto loans, home equity loans, lines of credit, and the like. This information is preferably comprised of account identifying indicia, interest rates, monthly payments, total balances and available credit, etc.

User personal information 108 represents the information gathered if the user elects to make a formal registration i.e., user ID and password with system 10. It is contemplated that it is not necessary for the user to provide personal information 108, i.e., the user need not formally register in order to use system 10. However, in an alternative embodiment, a user can be encouraged to provide personal information 108 for example their name, address, social security number, date of birth and other demographic information, perhaps by offering the user a free copy of the results of a credit check. Registered users information can also be stored in a personal profile allowing the registered user to bypass the data input step on future visits to the site. Registered users should be given the opportunity to update and edit their personal profile. It is also contemplated that in exchange for providing user personal information 108, the provider of system 10 can implement business decision rules which compensate the user in some fashion, for example, by discounting an interest rate, offering a rebate or prize, etc.

Providing user personal information 108 allows information processor 12 to consider additional factors during the business decision rules processing step. For example, obtaining a credit check to determine the user's credit worthiness allows information processor 12 to determine an interest rate and/or product based, in part, on the user's credit worthiness. Similarly providing user personal information 108 also allows the system, through a log-in ID and password mechanism, to identify the user. Logging into system 10 allows the user's input data to be saved, thereby allowing the user to start and stop data entry and product evaluation at any time. In the case where the user is not registered, leaving the website associated with system 10 typically requires that the user begin data entry and analysis from the beginning.

Information processor 12 also gathers service provider product data 110. Service provider product data 110 corresponds to those products which are available for information processor 12 to consider during the decision rules processing step (step S104). Service provider product data 110 includes residential loans such as mortgages, credit cards, automobile loans, home equity loans and lines of credit, etc. Service provider product data 110 can be stored on a database within information processor 12 or can be gathered from product processors 18.

It is preferred that product processor 18 be able to provide information concerning outside products; that is products that are offered by someone other than the system provider. Outside service provider products can be stored on the database within processor 12 or can be gathered from the Internet as needed. The system provider can charge a fee to outside providers to be included in the database or gathering process. Links can be provided so that the user can either apply for an outside product on-line or receive further information.

Information processor 12 provides credit summary output 112 in the form of credit summary display screen 52 to the user, taking into account user objective 104, user credit profile 106 and user profile information 108 (when user profile information is supplied).

In step S104 (FIG. 3), information processor 12 processes user objective 104, user credit profile 106, user personal information 108 and service provider product data 110 using a comprehensive set of predetermined business decision rules to determine those products which meet the user's criteria based on the service providers products and presents the results in the form of multi-level output 114. An example of multi-level output 114 is discussed above.

Figure 15:
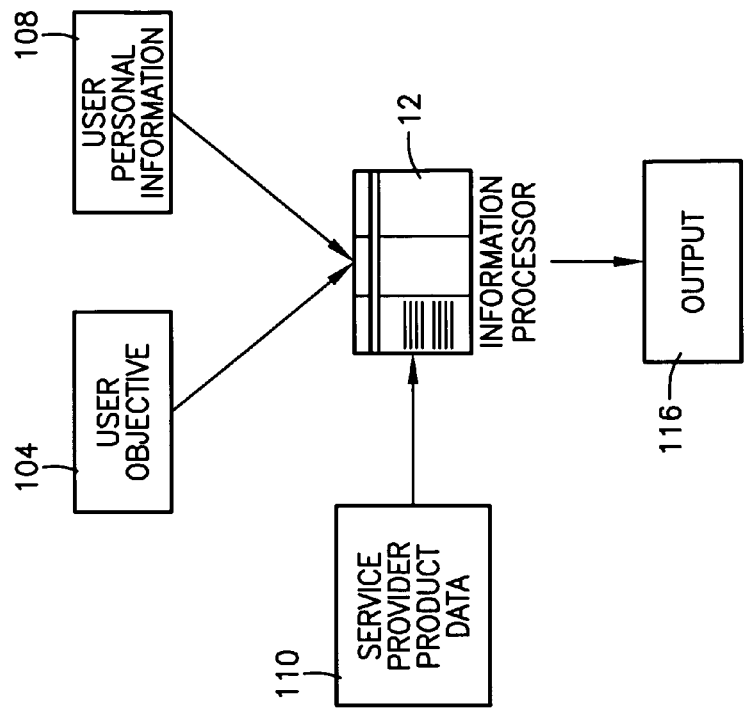
FIG. 15 is a block diagram of an input and output flow of the present invention from the perspective of an information processor in the case where a user's financing objective is obtaining credit.

FIG. 15 is a block diagram showing the input and output flows with respect to information processor 12 in the case where the user indicates his objective as obtaining credit, for example, as shown by obtain credit objective indicator 24c in FIG. 4. As shown in FIG. 15, information processor 12 receives user objective 104 and, where provided, user personal information 108 from the user. Information processor 12 also gathers service provider product data 110. In the case of user objective 104, the user also selects the particular type of credit they wish to obtain, for example, from obtain credit display screen 28 (FIG. 5).

Based on the user's stated objective and the list of products available, information processor 12 provides output 116 to the user via user terminal 14. Output 116 is preferably comprised of particularized information relating to the user's credit objective. For example, referring to FIG. 5, a user who wishes to obtain credit for a vacation will be provided with details relating to how one may finance a vacation and what products offered by the service provider are recommended for vacation financing. It is also contemplated that the user can apply on-line for the particular type of credit they seek.

Figure 14:
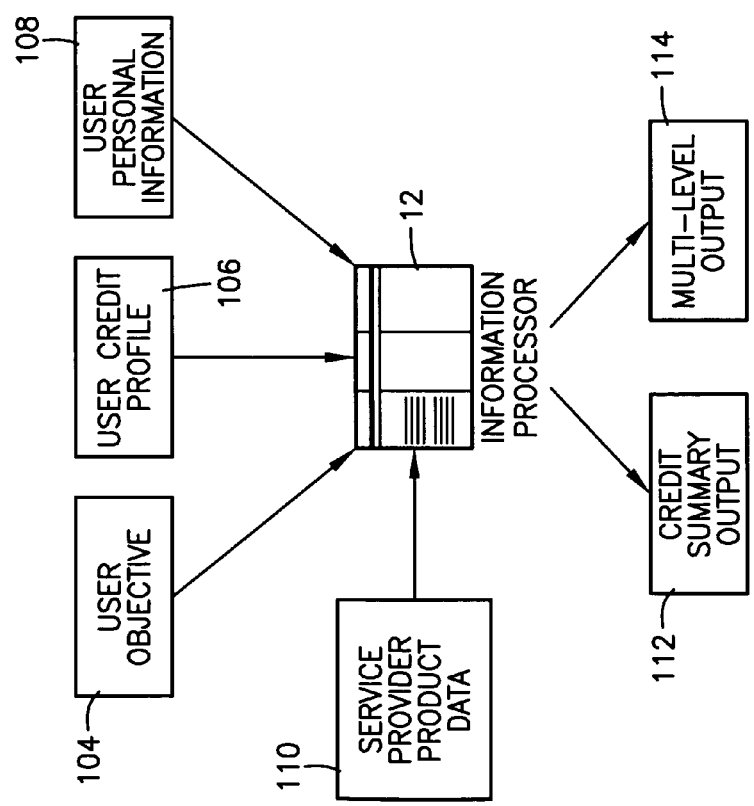
FIG. 14 is a block diagram of an input and output flow of the present invention from the perspective of an information processor in the case where a user's financing objective is to reduce payments or reduce interest.

The difference between multi-level output 114 as shown in FIG. 14 and output 116 as shown in FIG. 15 is that output 116 is not determined based on user credit profile 106. In other words, in the case of output 116, information processor 12 has not considered the user's current credit status but instead, determines a list of potential products based on the type of credit the user wishes to obtain. This aspect of the present invention conveniently allows a user to see what credit options are available prior to engaging in the credit data entry process.

Figure 16A:
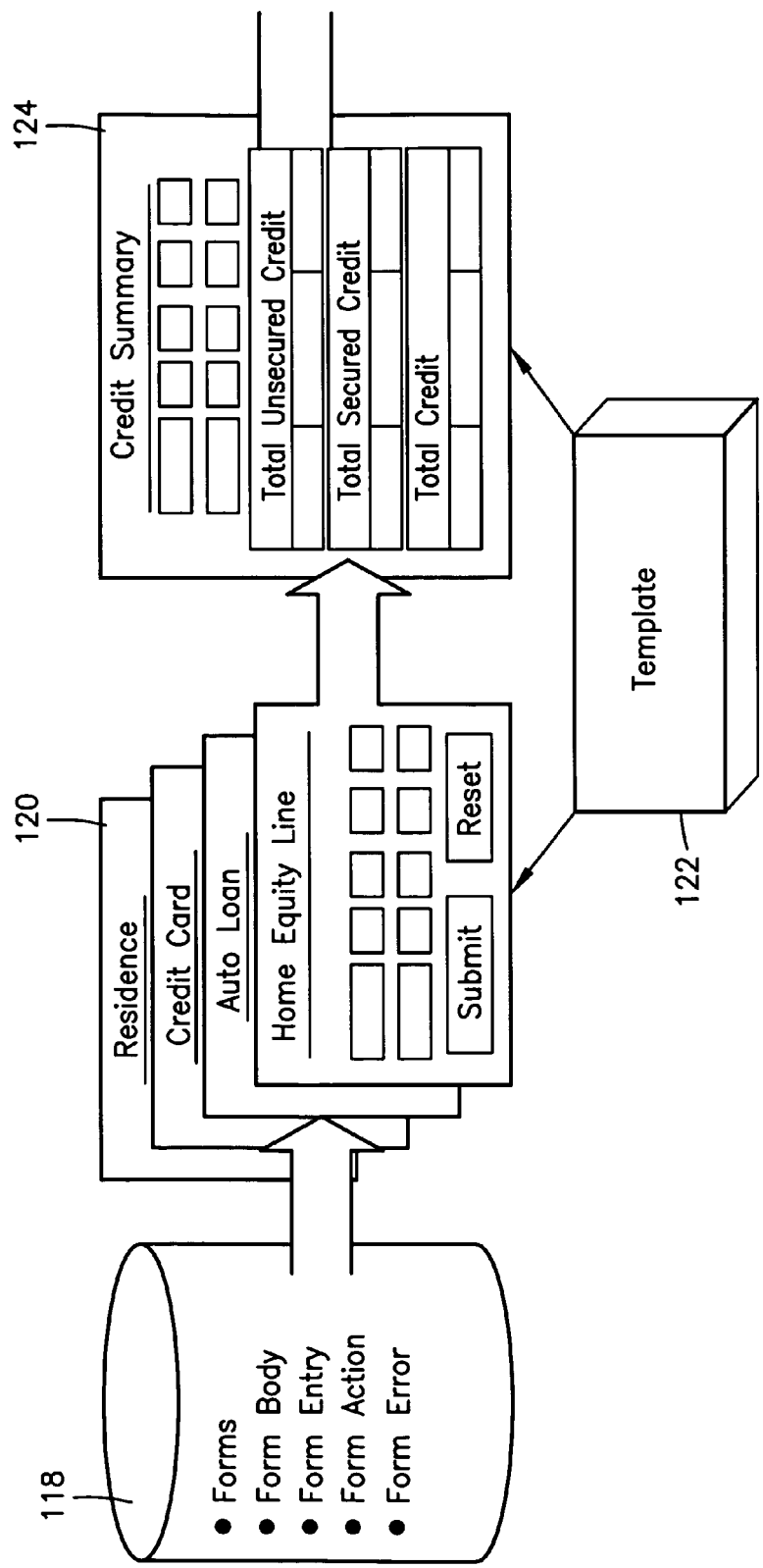
FIG. 16 is a diagram showing a process flow of the present invention from the perspective of an information processor.

FIG. 16 is a diagram showing a process flow of the present invention from the perspective of information processor 12. As shown in FIG. 16, information processor 12 implements various form portions 118 to create data input display screens 120 based on templates 122. Applications for developing form templates are known.

In order to create data input display screens 120, information processor 120 selects a template 122 upon which a form body, form entry areas, form completion rules, form action and error are imposed from among form portions 118. For example, the form body is preferably comprised of the displayed form text. Form entry areas provide the user with areas in which data are entered. Form completion rules set forth the requirements for how the how form is to be completed, for example, a name and electronic mail address must be provided, but a telephone number is optional, etc. Form action and error define what happens to a properly and improperly completed form, respectively. Data input display screens 120 are presented on user terminal 14 as discussed above.

When the user submits credit data to information processor 12, information processor 12 retrieves a credit summary template from among templates 122, makes all necessary calculations, for example determining average interest rates, total credit balances, and the like, and generates credit summary display screen 124, an example of which is shown as credit summary display screen 52 in FIG. 7.

Information processor 12 applies business rules to the user's data based on available products to derive the multi-level summary and detail displays. For example, information processor 12 implements business rules which are based on the user's geographic state, i.e., state of residence, other constants, current interest rates for available products, whether the user's objectives include a current or desired home loan or home equity line of credit (HE LOC) as well as payfast.

Payfast is a feature of the present invention which provides the user with an analysis of how the user's payment duration will be shortened if the user applies the savings resulting from particular product(s) to pay down the principal of the selected product. For example, a user who has twenty-four months remaining on an outstanding secured loan may be presented with a refinancing opportunity to lower interest rates and therefor monthly payments. By making the same payment amount as the current payment on the refinanced loan, the user may be able to shorten the remaining term to less than twenty-four months.

Business rules 126 are preferably stored in a database associated with information processor 12. Information processor 12 generates level one and two displays 128 as discussed above. Further, information processor 12 compiles pictorial representations 130 to provide a detail view of the products and/or consolidation options available to the user.

The present invention advantageously provides a comprehensive system by which a user can utilize a web browser to input a modest set of data relating to their current credit situation and indicate a financing objective. The system advantageously accepts this data and, using a set of business decision rules, considers the user's credit data in conjunction with products offered by the service provider so as to provide the user with an optimized credit financing opportunity list presented in the form of a multi-level view of their current credit profile compared with products offered by the service provider which will meet the user's objective, i.e., save the user money by lowering their interest rate or lowering monthly payments, etc. The multi-level display includes a summary view of the available options, and allows the user to obtain detailed information, in the form of graphs, charts, and the like so that the user can determine which proposed option, if any, is beneficial to them. Further, the user can apply on-line for those products for which the user is interested.

It is very important for the user of the system to have a high level of trust and confidence that the options presented are unbiased and represent the most beneficial proposal to meet the stated objectives. In other words, all options presented must meet the user's criteria. User confidence is further enhanced by presenting outside or third party offerings that meet the user's criteria. It is preferable to present the option that is most beneficial in meeting the user's stated objectives when more than one option satisfies the criteria. Alternatively, a full list of all options meeting the user's objectives can be displayed allowing the user to select between them.

The present invention advantageously obviates the need for the user to have custom software on user terminal 14 because information processor 12 provides all necessary forms, Java applets, Active-X control programs and the like to user terminal 14. In other words, the present system goes beyond mere electronic calculators and routing, aiding the user in a manner which allows the user to make an informed decision as to which financing products meets their needs. This can be done in the comfort of the user's own home, place of business, etc., such that the user need not personally visit the service provider location.

Although the present invention has been described in the preferred embodiment as relating to financial products, the system and method described is portable allowing the method to be used in other applications. More generally, the present invention is an expert decision-making platform that utilizes an electronic network such as the Internet to present a user with a list of optimized choices selected on the basis of selectable criteria.

Figure 17:
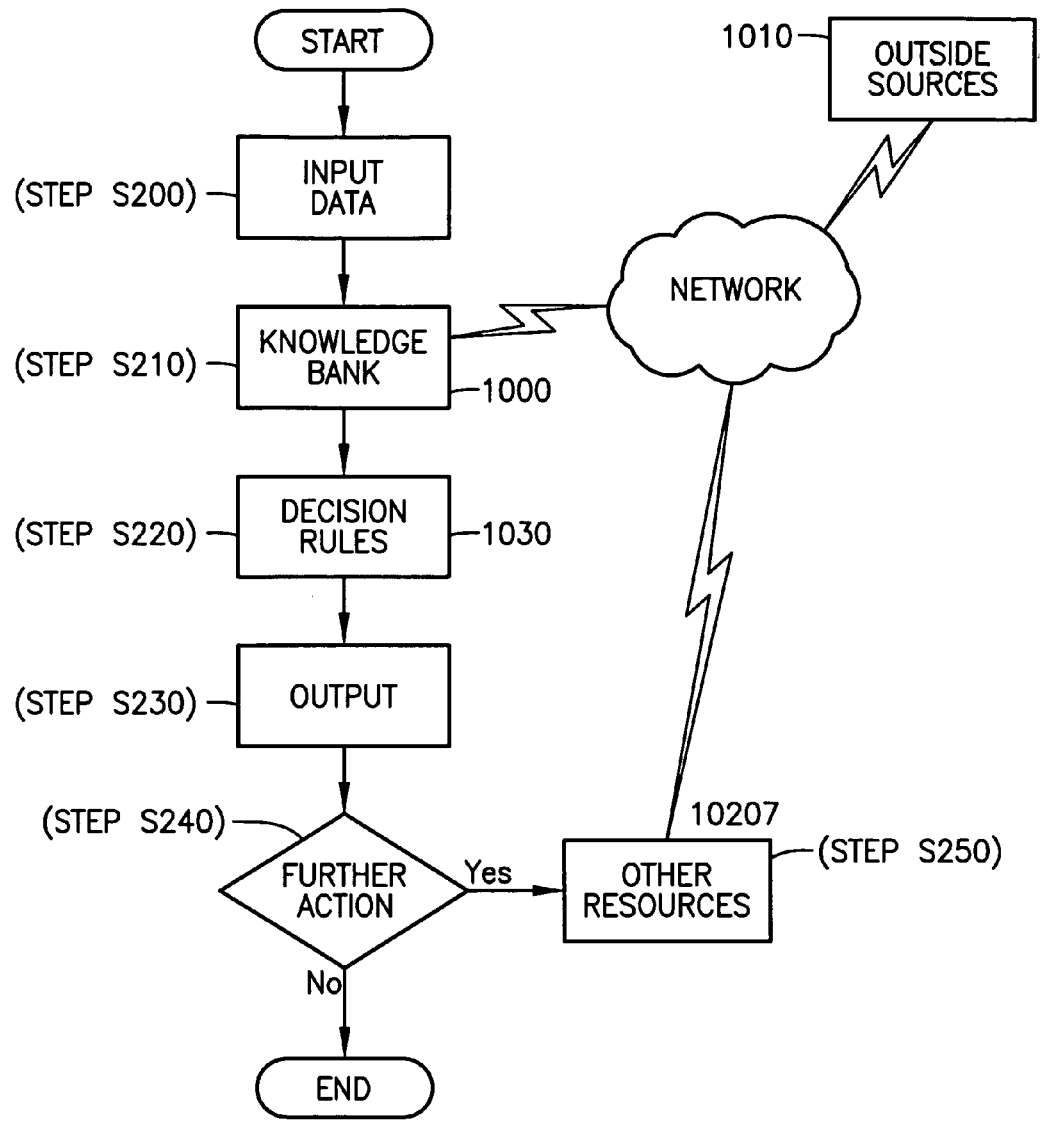
FIG. 17 is a flow chart of an alternate embodiment according to the general operative process of the present invention.

Referring to FIG. 17, a user at an input terminal, inputs a topic requiring optimization (step 200). The input data is sent to a knowledge bank 1000 (step 210). Knowledge banks are sophisticated data banks which perform artificial intelligence functions as is known in the art. Knowledge bank 1000 is preferably connected to outside resources 1010 through an electronic network (i.e. Internet). Outside resources 1010 can include other knowledge banks, web pages, business providers, etc. which help knowledge bank 1000 keep current and broad in scope. Knowledge bank 1000 sends the results of the queries based on user input (step 200) to a decision rules processor 1030 (step 220). The output from step 220 is displayed to the user in step 230. In step 240, the user may choose to take further action such as visit a recommended website or make a purchase (step 250) or end the process. For example, a user interested in optimizing her insurance coverage, could select from among objectives like maximum coverage for a given premium or future cash value etc. After inputting the appropriate personal data, the system can present the user with options meeting the stated objective. Links can be provided allowing the user to apply online for a selected product.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for allowing a user of a user terminal to receive credit financing opportunities based on a multi-level output of opportunities, the method comprising:

electrically receiving credit data from the user terminal, the credit data comprising a user objective and a credit profile, wherein the user objective is received from the user and is selected from the group consisting of: (1) modifying an interest rate, (2) modifying a monthly payment, and (3) obtaining credit, loan or other financing, and the credit profile comprises at least one particular of any number of financial products currently held by the user;

electrically determining at least one credit financing opportunity based on the credit data and at least one predetermined decision rule, wherein the at least one credit financing opportunity comprises any number of financial products that meet the user objective;

electrically determining if the at least one credit financing opportunity benefits the user in comparison to the financial products held by the user, wherein the benefit comprises a savings to the user of at least a predetermined amount of money or other value;

electrically generating at least one multi-level output, wherein the multi-level output comprises: (1) a comparison of at least part of the credit profile with the at least one determined credit financing opportunity that benefits the user, and (2) the benefit received by the user if the at least one credit financing opportunity is pursued; and electrically providing the multi-level output to the user terminal, wherein the multi-level output is selectable by the user and comprises: (1) a first level output interface comprising at least one comparison area, wherein each of the at least one comparison area comprises a current product portion providing particulars on a current user financial product, and a proposed product portion providing particulars on the at least one determined credit financing opportunity that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output.

2. The method according to claim 1, further including receiving a request from the user terminal to apply for a determined credit opportunity.

3. The method according to claim 1, where in the credit profile is comprised of a least one user credit data element, the at least one user credit data element identifying one or more characteristics of corresponding financing previously undertaken by the user.

4. The method according to claim 3, wherein generating the output includes generating a first level output and generating a second level output.

5. The method according to claim 4, wherein the first level output includes one or more comparisons of a determined credit opportunity with a respective one of the at least one user credit data elements.

6. The method according to claim 4, wherein there are a plurality of credit data elements and the second output includes one or more comparisons of a determined credit opportunity with the plurality of user credit data elements.

7. The method according to claim 1, further comprising providing a summary of the user profile data to the user terminal.

8. The method according to claim 3, wherein the at least one user credit data element includes an interest rate, an outstanding balance and a monthly payment.

9. The method according to claim 8, wherein the at least one user credit data element further includes an identification of whether the corresponding credit data element was issued by a provider of the financing opportunities.

10. The method according to claim 3, wherein the at least one user credit data element corresponds to a least one of a credit card, a vehicle loan, a secured debt, an unsecured debt, a home equity loan and a residential mortgage.

11. The method according to claim 7, wherein the summary includes at least one summary area corresponding to one of the user's credit cards, personal lines of credit, personal loans, home equity lines of credit, auto loans, unsecured credit and total outstanding credit.

12. The method according to claim 1, wherein the user data further includes personal data corresponding to the user and further including the act of obtaining a credit worthiness report based on the personal data.

13. The method according to claim 12, wherein determining credit financing opportunities includes consideration of the credit worthiness of the corresponding user.

14. The method according to claim 1, wherein a credit opportunity is considered viable if it is determined in the determining act that the user will save at least a predetermined amount of money during a predetermined time period.

15. The method according to claim 1, wherein the user profile data includes a state of residence and wherein the predetermined decision rules include consideration of the state of residence and current interest rates for potential financing opportunities.

16. The method according to claim 1, further including receiving a request for detailed information corresponding to a selected one of the financing opportunities and wherein at least a part of the output is provided in a substantially pictorial form.

17. The method according to claim 16, wherein the pictorial form includes at least one of a graph and a pie chart.

18. The method according to claim 15, wherein the predetermined decision rules further consider the user's taxation rate in determining viable credit opportunities.

19. The method according to claim 1, further comprising preparing a list of potential financing opportunities at least partially based on opportunity data received from at least one product processor, and wherein the determined financing opportunities are selected from the prepared list.

20. The method of claim 1 wherein the credit profile comprises at least one loan, line of credit, credit card, secured or unsecured credit, bank or provider, interest rate, outstanding balance, monthly payment, available line of credit, balance, term, and years remaining in access period.

21. The method of claim 1 wherein the user objective comprises at least one of obtain a lower interest rate, obtain lower payments, obtain credit, or any other objective.

22. The method of claim 1 wherein the benefit comprises saving the user money.

23. The method of claim 1 wherein the multi-level output comprises an interface that presents the user with: (1) new financing opportunities that meet the user's objective, and (2) an icon that permits the user to initiate consolidation opportunities that meet the user's objective.

24. A computer readable storage medium storing computer executable instructions which, when executed, perform a method for allowing a user of a user terminal to receive credit financing opportunities based on a multi-level output of opportunities, the method comprising:

electrically receiving credit data from the user terminal, the credit data comprising a user objective and a credit profile, wherein the user objective is received from the user and is selected from the group consisting of: (1) modifying an interest rate, (2) modifying a monthly payment, and (3) obtaining credit, loan or other financing, and the credit profile comprises at least one particular of any number of financial products held by the user;

electrically determining credit financing opportunities based on the credit data and at least one predetermined decision rule, wherein the credit financing opportunities comprise at least one financial product that meets the user objective;

electrically determining if the credit financing opportunities benefit the user in comparison to the financial products held by the user, wherein the benefit comprises a savings to the user of at least a predetermined amount of money or other value;

electrically generating at least one multi-level output, wherein the multi-level output comprises: (1) a comparison of at least part of the credit profile with the determined credit financing opportunities that benefits the user, and (2) the benefit the user would receive if the credit financing opportunities are pursued; and electrically providing the multi-level output to the user terminal, wherein the multi-level output is selectable by the user and comprises: (1) a first level output interface comprising at least one comparison area, wherein each of the at least one comparison area comprises a current product portion providing particulars on a current user financial product, and a proposed product portion providing particulars on the at least one determined credit financing opportunity that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output.

25. The computer readable storage medium according to claim 24, wherein the method further includes receiving a request from the user terminal to apply for a determined credit opportunity.

26. The computer readable storing medium according to claim 24, wherein the credit profile is comprised of t least one user credit data element, the at least one user credit data element identifying one or more characteristics of corresponding financing previously undertaken by the user.

27. The method according to claim 26, wherein generating the output includes generating a first level output and generating a second level output.

28. The computer readable storage medium according to claim 27, wherein the first level output includes one or more comparisons of a determined credit opportunity with a respective one of the at least one user credit data elements.

29. The computer readable storage medium according to claim 27, wherein there are a plurality of credit data elements and the second output includes one or more comparisons of a determined credit opportunity with the plurality of user credit data elements.

30. The computer readable storage medium according to claim 26, where the at least one user credit data element includes an interest rate, an outstanding balance and a monthly payment.

31. The computer readable storage medium according to claim 30, wherein the at least one user credit data element further includes an identification of whether the corresponding credit data element was issued by a provider of the financing opportunities.

32. The computer readable storage medium according to claim 26, wherein the at least one user credit data element corresponds to at least one of a credit card, a vehicle loan, a secured debt, an unsecured debt, a home equity loan and a residential mortgage.

33. The computer readable storage medium according to claim 24, wherein the method further includes providing a summary of the user profile data to the user terminal.

34. The computer readable storage medium according to claim 33, wherein the summary includes at least one summary area corresponding to one of the user's credit cards, personal lines of credit, personal loans, home equity lines of credit, auto loans, unsecured credit and total outstanding credit.

35. The computer readable storage medium according to claim 24, wherein the user data further includes personal data corresponding to the user and the method further includes the act of obtaining a credit worthiness report based on the personal data.

36. The computer readable storage medium according to claim 35, wherein determining credit financing opportunities includes consideration of the credit worthiness of the corresponding user.

37. The computer readable storage medium according to claim 24, wherein the credit opportunity is considered viable if it is determined that the user will save at least a predetermined amount of money during a predetermined time period.

38. The computer readable storage medium according to claim 24, wherein the user profile data includes a state of residence and wherein the predetermined decision rules include consideration of the state of residence and current interest rates for potential financing opportunities.

39. The computer readable storage medium according to claim 38, wherein the predetermined decision rules further consider the user's taxation rate in determining the viable credit opportunities.

40. The computer readable storage medium according to claim 24, wherein the method further includes accepting a request for detailed information corresponding to a selected one of the financing opportunities and wherein at least a part of the output is provided in a substantially pictorial form.

41. The computer readable storage medium according to claim 40, wherein the pictorial form includes at least one of a graph and a pie chart.

42. The computer readable storage medium according to claim 24, wherein the method further includes preparing a list of potential financing opportunities at least partially based on opportunity data received from at least one product processor, and wherein the determined financing opportunities are selected from the prepared list.

43. An information processor in a financial processing system, the information processor coupled to at least one user terminal via a communication network, the information processor comprising:
- a memory storing at least one decision rule;
- a network interface coupling the information processor to the communication network; and
- a central processing unit performing the functions of:
  - electrically receiving, via the network interface, credit data from the user terminal, the credit data comprising a user objective and a credit profile, wherein the user objective is received from the user and is selected from the group consisting of: (1) modifying an interest rate, (2) modifying a monthly payment, and (3) obtaining credit, loan or other financing, and the credit profile comprises at least one particular of any number of financial products held by the user;
  - electrically determining credit financing opportunities, the determination being based on the credit data and at least one predetermined decision rule, wherein the credit financing opportunities comprising at least one financial product that meets the user objective;
  - electrically determining if the credit financing opportunities benefit the user in comparison to the financial products held by the user, wherein the benefit comprises a savings to the user of at least a predetermined amount of money or other value;
  - electrically generating at least one multi-level output, wherein the multi-level output comprising: (1) a comparison of at least part of the credit profile with the determined credit financing opportunities that benefits the user, and (2) the benefit the user would receive if the credit financing opportunities are pursued; and
  - electrically providing the output to the user terminal, wherein the multi-level output is selectable by the user and comprises: (1) a first level output interface comprising at least one comparison area, wherein each of the at least one comparison area comprises a current product portion providing particulars on a current user financial product, and a proposed product portion providing particulars on the at least one determined credit financing opportunity that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output.

44. The information processor according to claim 43, further comprising a database coupled to the central processing unit, the database storing data corresponding to at least one financing opportunity.

45. The information processor according to claim 43, wherein the central processing unit further performs the function of receiving a request from the user terminal to apply for a determined credit opportunity.

46. The information processor according to claim 43, wherein the credit profile is comprised of at least one user credit data element, the at least one user credit data element identifying one or more characteristics of corresponding financing previously undertaken by the user.

47. The information processor according to claim 46, wherein the output is comprised of a first level output and a second level output.

48. The information processor according to claim 47, wherein the first level output includes one or more comparisons of a determined credit opportunity with a respective one of the at least one user credit data elements.

49. The information processor according to claim 47, where there are a plurality of credit data elements and the second output includes one or more comparisons of a determined credit opportunity with the plurality of user credit data elements.

50. The information processor according to claim 46, wherein the at least one user credit data element includes an interest rate, an outstanding balance and a monthly payment.

51. The information processor according to claim 50, wherein the at least one user credit data element further includes an identification of whether the corresponding credit data element was issued by a provider of the financing opportunities.

52. The information processor according to claim 46, wherein the at least one user credit data element corresponds to at least one of a credit card, a vehicle loan, a secured debt, an unsecured debt, a home equity loan and a residential mortgage.

53. The information processor according to claim 43, wherein the central processing unit further performs the function of providing a summary of the user profile data to the user terminal.

54. The information processor according to claim 53, wherein the summary includes at least one summary area corresponding to one of the user's credit cards, personal lines of credit, personal loans, home equity lines of credit, auto loans, unsecured credit and total outstanding credit.

55. The information processor according to claim 43, wherein the user data further includes personal data corresponding to the user and the central processing unit further performs the function of obtaining a credit worthiness report based on the personal data.

56. The information processor according to claim 55, wherein the determining function includes consideration of the credit worthiness of the corresponding user.

57. The information processor according to claim 43, wherein the central processing unit considers a credit opportunity to be viable if the determining function determines that the user will save at least a predetermined amount of money during a predetermined time period.

58. The information processor according to claim 43, wherein the user profile data includes a state of residence and wherein the predetermined decision rules include consideration of the state of residence and current interest rates for potential financing opportunities.

59. The information processor according to claim 58, wherein the predetermined decision rules further consider the user's taxation rate in determining viable credit opportunities.

60. The information processor according to claim 43, wherein the central processing unit further performs the function of accepting a request for detailed information corresponding to a selected one of the financing opportunities and wherein at least a part of the output is provided in a substantially pictorial form.

61. The information processor according to claim 60, wherein the pictorial form includes at least one of a graph and a pie chart.

62. A method for allowing a user of a user terminal to apply for a credit financing opportunity via a communication network, the method comprising:

electrically receiving credit data from the user terminal, the credit data comprising a user objective indicating that the user wishes to obtain credit and a credit profile, wherein the user objective is received from the user and is selected from the group consisting: (1) modifying an interest rate, (2) modifying a monthly payment, and (3) obtaining credit, loan or other financing, and the credit profile comprises at least one particular of any number of financial products currently held by the user;

electrically determining potential financing products based at least in part on the credit data, wherein the potential financing products comprise at least one financial product that meets the user objective;

electrically determining if the determined potential financing products benefit the user in comparison to the financial products held by the user, wherein the benefit comprises a savings to the user of at least a predetermined amount of money or other value;

electrically providing a list of the determined potential financing products that benefit the user to the user terminal and a comparison of at least part of the credit profile with the determined potential financing products that benefit the user, wherein the list of the determined financing products is presented as a multi-level output, and wherein the multi-level output is selectable by the user and comprises: (1) a first level output interface comprising at least one comparison area, wherein each of the at least one comparison area comprises a current product portion providing particulars on a current user financial product, and a proposed product portion providing particulars on at least one of the determined potential financing products that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output;

electrically receiving a request from the user terminal for information corresponding to a selected one of the potential financing products that benefit the user;

electrically providing the information to the user terminal; and electrically receiving a request from the user terminal to initiate an application for the selected financing product.

63. The method according to claim 62, wherein the list of potential financing products includes:

vehicle loans;
education loans;
home improvement loans;
home purchase loans;
medical expense loans;
large event loans; and vacation loans.

64. A method for allowing a user of a terminal to receive optimized information regarding a selected topic based on a multi-level output of opportunities, the method comprising:

electrically receiving input data from the user terminal, the input data comprising a user objective and a current usage profile, wherein user objective is received from the user and comprises a designation for: (1) modifying an interest rate, (2) modifying a monthly payment, or (3) obtaining credit, loan or other financing, and the credit profile comprises at least one particular of any number of financial products currently held by the user;

electrically querying a knowledge base regarding the input data;

electrically retrieving operational data from the knowledge base;

electrically determining optimized information based on the results of applying at least one predetermined decision rule to the operational data, the user objective and current usage profile, wherein the optimized information comprises at least one financial product that meets the user objective;

electrically determining if the optimized information benefits the user in comparison to the financial products held by the user, wherein the benefit comprises a savings to the user of at least a predetermined amount of money or other value;

electrically generating at least one multi-level output comprising a comparison of at least part of the current usage profile with the determined optimized information; and electrically providing the multi-level output to the terminal, wherein the multi-level output is selectable by the user and comprises: (1) a first level output interface comprising at least one comparison area, wherein each of the at least one comparison area comprises a current product portion providing particulars on a current user financial product, and a proposed product portion providing particulars on at least one determined credit financing opportunity that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output.

65. The method of claim 64, wherein the knowledge base is connected to an electronic network.

66. The method of claim 65, wherein the output includes links to at least one other electronic site.

67. The method of claim 65, farther comprising the steps of:

queryingat least one search engine concerning the input data; and processing the results of the querying of at least one search engine.

68. The method of claim 64, wherein the output includes a list of the optimized information.

69. A method for allowing a user of a user terminal to receive credit financing opportunities based on a multi-level output of opportunities, the method comprising:

presenting a user with a plurality of objectives, wherein the plurality of objectives comprises at least a lowering an interest rate selection and a lowering a monthly payment selection;

electrically receiving credit data from the user terminal, the credit data including a user objective selection and a credit profile, wherein the user objective selection comprises the lowering an interest rate selection or the lowering a monthly payment selection and the credit profile comprises at least one interest rate or monthly payment associated with at least one financial products held by the user;

electrically comparing the at least one interest rate or monthly payment associated with the at least one financial products held by the user with at least one financing opportunity;

electrically determining at least one financing opportunity that meet the user objective, said determination being based on at least one predetermined decision rule;

electrically determining if the at least one financing opportunity benefits the user in comparison to the financial products held by the user, wherein the benefit comprises a savings to the user of at least a predetermined amount of money or other value;

electrically generating at least one multi-level output, wherein the multi-level output comprising a comparison of at least part of the credit profile with the at least one determined credit financing opportunity that benefits the user, the comparison demonstrating that the at least one financing opportunity that meet the user objective has a lower interest rate or lower monthly payment than the at least one financial products held by the user; and electrically providing the multi-level output to the user terminal, wherein the multi-level output is selectable by the user and comprises: (1) a first level output interface comprising at least one comparison area, wherein each of the at least one comparison area comprises a current product portion providing particulars on a current user financial product, and a proposed product portion providing particulars on the at least one determined credit financing opportunity that meets the user's objective, and (2) a second-level output interface comprising at least one proposed consolidation opportunity that meets the user's objective, wherein the at least one consolidation opportunity consolidates the user's current debt to meet the user's objective, and wherein the second-level output is presented to the user upon the user initiating an icon included in the first-level output.

\* \* \* \* \*